United States Patent
Peralta et al.

(10) Patent No.: US 12,388,493 B2
(45) Date of Patent: *Aug. 12, 2025

(54) WIRELESS POWER TRANSMISSION SYSTEM UTILIZING MULTIPLE TRANSMISSION ANTENNAS WITH COMMON ELECTRONICS

(71) Applicant: NuCurrent, Inc., Chicago, IL (US)

(72) Inventors: Alberto Peralta, Chicago, IL (US); Md. Nazmul Alam, Glendale Heights, IL (US); Pavel Shostak, San Diego, CA (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/680,834

(22) Filed: May 31, 2024

(65) Prior Publication Data

US 2025/0007559 A1    Jan. 2, 2025

Related U.S. Application Data

(63) Continuation of application No. 17/410,145, filed on Aug. 24, 2021, now Pat. No. 12,003,284, which is a
(Continued)

(51) Int. Cl.
*H04B 5/26* (2024.01)
*H02J 50/12* (2016.01)
(Continued)

(52) U.S. Cl.
CPC .............. *H04B 5/26* (2024.01); *H02J 50/12* (2016.02); *H02J 50/40* (2016.02); *H02J 50/80* (2016.02)

(58) Field of Classification Search
CPC .......... H04B 5/0081; H04B 5/26; H02J 50/12; H02J 50/40; H02J 50/80
See application file for complete search history.

(56) References Cited

U.S. PATENT DOCUMENTS

| | | | |
|---|---|---|---|
| 10,985,617 B1* | 4/2021 | Johnston | H02J 50/005 |
| 2010/0201201 A1* | 8/2010 | Mobarhan | H02J 7/0044 |
| | | | 320/108 |

(Continued)

FOREIGN PATENT DOCUMENTS

WO    2014174785 A1    10/2014

OTHER PUBLICATIONS

EP Application 21736228.4, EP Extended Search Report, dated Dec. 22, 2023, 10 pages.
(Continued)

*Primary Examiner* — Raymond S Dean
(74) *Attorney, Agent, or Firm* — Lee Sullivan Shea & Smith LLP

(57) ABSTRACT

A wireless power transmission system includes, at least, a first transmission antenna and a second transmission antenna, both in electrical connection with a common power conditioning system of the system. The first transmission antenna transmits output power and includes a first pole and a second pole, while the second transmission antenna also transmits the output power and includes a third pole and a fourth pole. The first and second transmission antennas are in electrical connection with the power conditioning system via at least one of the first pole and the second pole and at least one of the third pole and the fourth pole. Further, at least one of the first pole and the second pole is in electrical connection with at least one of the third pole and the fourth pole.

20 Claims, 18 Drawing Sheets

Related U.S. Application Data continuation of application No. 16/733,521, filed on Jan. 3, 2020, now Pat. No. 11,101,848.

(51) Int. Cl.
*H02J 50/40* (2016.01)
*H02J 50/80* (2016.01)

(56) References Cited

U.S. PATENT DOCUMENTS

| | | |
|---|---|---|
| 2012/0146576 A1 | 6/2012 | Partovi |
| 2015/0171657 A1* | 6/2015 | Wheeland ............... H04B 5/79 307/104 |
| 2015/0372498 A1 | 12/2015 | Ichikawa et al. |
| 2016/0344094 A1* | 11/2016 | Singh ..................... H01F 29/02 |
| 2017/0005481 A1* | 1/2017 | Von Novak, III ...... H02J 50/70 |
| 2017/0187250 A1 | 6/2017 | Cha |
| 2017/0324450 A1 | 11/2017 | Lee et al. |
| 2018/0233801 A1 | 8/2018 | Peralta et al. |
| 2018/0233967 A1 | 8/2018 | Peralta et al. |
| 2018/0269727 A1 | 9/2018 | De Rooij et al. |
| 2019/0097461 A1 | 3/2019 | Singh et al. |
| 2019/0199137 A1* | 6/2019 | Jiang ....................... H04B 5/43 |
| 2019/0247669 A1 | 8/2019 | Nielsen et al. |
| 2021/0152022 A1* | 5/2021 | Kim ....................... H01Q 1/525 |

OTHER PUBLICATIONS

PCT/US2021/012115 International Search Report and Written Opinion dated Apr. 27, 2021, 10 pages.

* cited by examiner

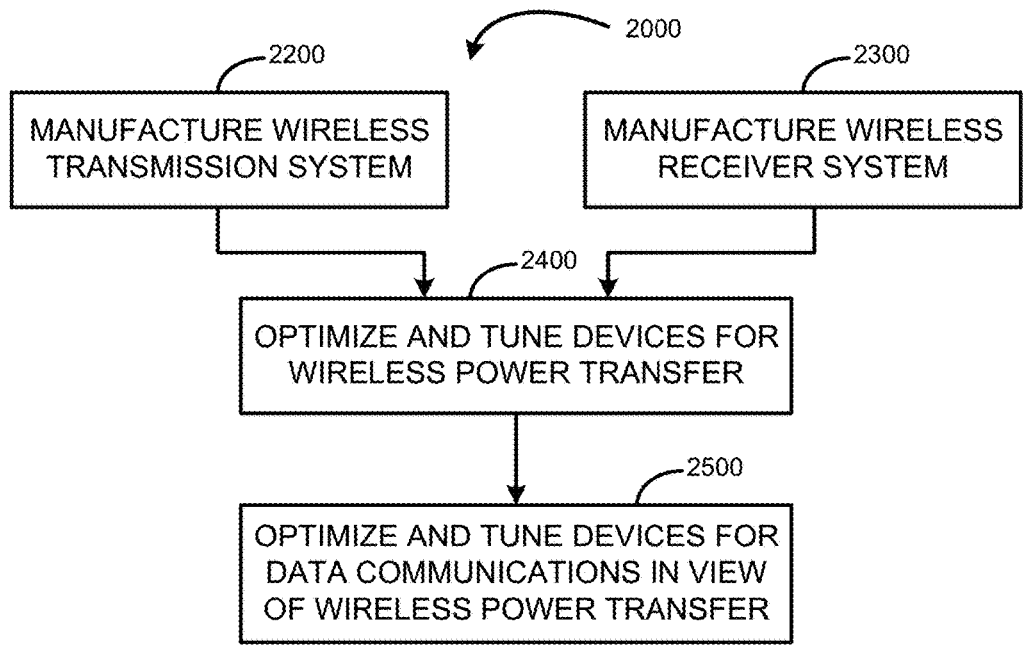
FIG. 21
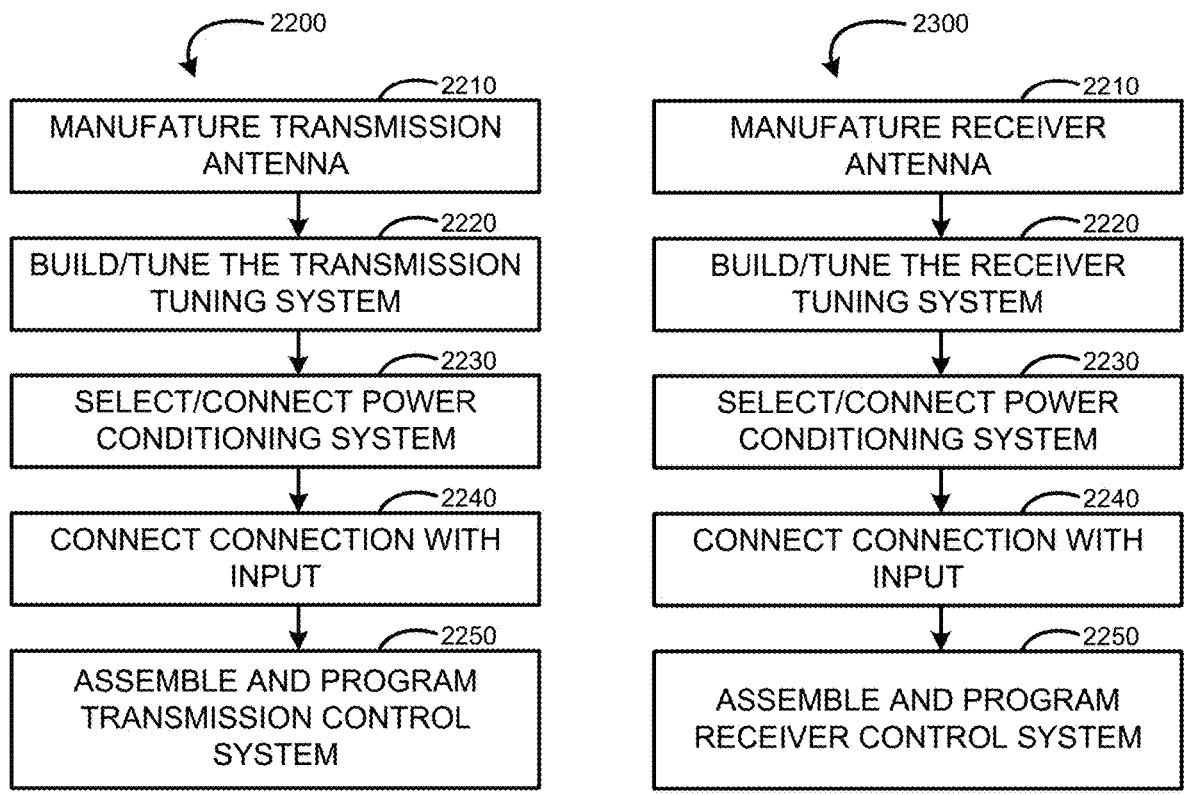
FIG. 22
FIG. 23

WIRELESS POWER TRANSMISSION SYSTEM UTILIZING MULTIPLE TRANSMISSION ANTENNAS WITH COMMON ELECTRONICS

CROSS-REFERENCE TO RELATED APPLICATIONS

This application is a continuation of, and claims priority to, U.S. Non-Provisional application Ser. No. 17/410,145, filed Aug. 24, 2021, and entitled "WIRELESS POWER TRANSMISSION SYSTEM UTILIZING MULTIPLE TRANSMISSION ANTENNAS WITH COMMON ELECTRONICS," which, in turn, is a continuation of, and claims priority to, U.S. Non-Provisional application Ser. No. 16/733,521, filed Jan. 3, 2020, and entitled "WIRELESS POWER TRANSMISSION SYSTEM UTILIZING MULTIPLE TRANSMISSION ANTENNAS WITH COMMON ELECTRONICS," the contents of each of which are incorporated herein by reference in their entirety.

TECHNICAL FIELD

The present disclosure generally relates to systems and methods for wireless transfer of electrical power and/or electrical data signals, and, more particularly, to wireless power transmission systems including a plurality of antennas for increased transmission range and/or multiple receiver transmission.

BACKGROUND

Wireless connection systems are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmission and receiver elements will often take the form of coiled wires and/or antennas.

Transmission of one or more of electrical energy, electrical power, electromagnetic energy and electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics, bill of materials (BOM) and/or form factor constraints, among other things. It is to be noted that, "self-resonating frequency," as known to those having skill in the art, generally refers to the resonant frequency of an inductor due to the parasitic characteristics of the component.

In some examples, antenna coils utilized in high frequency (generally, of a range from about 3 MHz to 1 GHz) coupling may produce constraints on size of coil antennas, due to self-resonant frequency (SRF), coil sensitivity, amplifier driving capability, and/or low coupling efficiency, among other things. In a non-limiting example, it has been seen in some systems operating at an operating frequency of 6.78 MHZ, that, due to such constraints, designers found difficulty in creating well-functioning antennas at a size larger than about 200 millimeters (mm) by about 200 mm. At high frequencies, experimental results have shown difficulty in designing large coils, without compromising the system's coil sensitivity, self-resonance, as it relates to mutual inductance, mass producibility, and uniform design, among other things.

To that end, in some wireless transmission antenna system designs, multiple antennas have been utilized to extend a system's coupling envelope and/or coupling area. Such designs have utilized multiple driver-to-antenna subsystems within the system, to increase the available space for energy, power, data and/or signal transfer. However, such systems drastically increase a system's bill of materials, by requiring separate amplifier circuitry for each antenna.

SUMMARY

In view of the above, new wireless transmission systems for transmission of one or more of electrical energy, electrical power, electromagnetic energy and electrical data, wherein increased coupling envelope and/or enablement of multiple device coupling can occur without drastically increasing bill of materials, are desired.

In accordance with one aspect of the disclosure, a wireless power transmission system is disclosed. The wireless power transmission system includes a power conditioning system, the power conditioning system operatively associated with an input power source, the input power source providing input electrical power and being connected to the wireless power transmission system, the power amplifier being configured to condition the input power to output power for transmission. The system further includes a first transmission antenna configured to transmit the output power the first transmission antenna including, at least, a first pole and a second pole, and a second transmission antenna configured to transmit the output power, the second transmission antenna including, at least, a third pole and a fourth pole. The first transmission antenna and second transmission antenna are in electrical connection with the power conditioning system via at least one of the first pole and the second pole and at least one of the third pole and the fourth pole. Further, at least one of the first pole and the second pole is in electrical connection with at least one of the third pole and the fourth pole.

In a refinement, the first transmission antenna and the second transmission antenna are in series electrical connection, with respect to the power conditioning system.

In a refinement, the power conditioning system includes a first power pole and a second power pole, the first pole is in electrical connection with the first power pole, the fourth pole is in electrical connection with the second power pole, and the second pole is in electrical connection with the third pole.

In a refinement, the system further includes a distributed capacitor in electrical connection with the first transmission antenna and the second transmission antenna, the distributed capacitor including a first capacitor pole and a second capacitor pole. In such a refinement, the power conditioning system includes a first power pole and a second power pole, the first pole is in electrical connection with the first power pole, the fourth pole is in electrical connection with the second power pole, the second pole is in electrical connection with the first capacitor pole, and the third pole is in electrical connection with the second capacitor pole.

In a further refinement, the system further includes a printed circuit board (PCB) and at least one of the first transmission antenna, the second transmission antenna, and the distributed capacitor are functionally coupled with the printed circuit board.

In another further refinement the power conditioning system includes, at least, the distributed capacitor.

In yet a further refinement, the system further includes a first interdigitated capacitor coupled with the first transmission antenna and a second interdigitated capacitor coupled with the second transmission antenna.

In another refinement, the system includes an interdigitated capacitor in electrical connection with the first transmission antenna and the second transmission antenna, the distributed capacitor including a first capacitor pole and a second capacitor pole. In such a further refinement the first pole is in electrical connection with the first power pole, the fourth pole is in electrical connection with the second power pole, the second pole is in electrical connection with the first capacitor pole, and the third pole is in electrical connection with the second capacitor pole.

In a further refinement, the system further includes a second interdigitated capacitor coupled with the first transmission antenna and a third interdigitated capacitor coupled with the second transmission antenna.

In another refinement, the system further includes a first interdigitated capacitor coupled with the first transmission antenna and a second interdigitated capacitor coupled with the second transmission antenna.

In another refinement, the first transmission antenna and the second transmission antenna are in parallel electrical connection, with respect to the power conditioning system.

In another refinement, the power conditioning system includes a first power pole and a second power pole, the first pole and the third pole are in electrical connection with the first power pole, and the second pole and the fourth pole are in electrical connection with the second power pole.

In accordance with another aspect of the disclosure, a wireless power system is disclosed. The wireless power system includes a wireless power transmission system and at least one wireless power receiver system. The wireless power transmission system includes a power conditioning system, the power conditioning system operatively associated with an input power source, the input power source providing input electrical power and being connected to the wireless power transmission system, the power amplifier being configured to condition the input power to output power for transmission. The system further includes a first transmission antenna configured to transmit the output power the first transmission antenna including, at least, a first pole and a second pole, and a second transmission antenna configured to transmit the output power, the second transmission antenna including, at least, a third pole and a fourth pole. The first transmission antenna and second transmission antenna are in electrical connection with the power conditioning system via at least one of the first pole and the second pole and at least one of the third pole and the fourth pole. Further, at least one of the first pole and the second pole is in electrical connection with at least one of the third pole and the fourth pole. Each of the at least one wireless power receiver systems is operatively associated with a load and each of the at least one wireless power receiver systems includes a receiver antenna configured to operatively couple with one or both of the first antenna and the second antenna for wireless power transfer.

In a refinement, each load associated with each of the at least one wireless power receiver systems is associated with a power storage device and the first transmission antenna and the second transmission antenna are in series electrical connection, with respect to the power conditioning system.

In a further refinement, the wireless power transmission system further includes a distributed capacitor in electrical connection with the first transmission antenna and the second transmission antenna, the distributed capacitor including a first capacitor pole and a second capacitor pole. In such a further refinement, the power conditioning system includes a first power pole and a second power pole, the first pole is in electrical connection with the first power pole, the fourth pole is in electrical connection with the second power pole, the second pole is in electrical connection with the first capacitor pole, and the third pole is in electrical connection with the second capacitor pole.

In another refinement, each load associated with each of the at least one wireless power receiver systems is associated with an electronic device, the electronic device configured to receive direct power from the wireless power transmission system at the load and the first transmission antenna and the second transmission antenna are in parallel electrical connection, with respect to the power conditioning system.

In accordance with yet another aspect of the disclosure, a method of operating a wireless power transmission system is disclosed. The method includes receiving input electrical power, from an input power source, at a power conditioning system and conditioning the input power, at the power conditioning system, to create output power for transmission by one or both of a first transmission antenna and a second transmission antenna, the first transmission antenna including a first pole and a second pole, and the second transmission antenna including a third pole and a fourth pole. The method further includes determining if at least one wireless receiver system is in couplable proximity to one or both of the first transmission antenna and the second transmission antenna. The method further includes wirelessly transmitting power to the at least one wireless receiver system by one or both of the first transmission antenna and the second transmission antenna. The first transmission antenna and second transmission antenna are in electrical connection with the power conditioning system via at least one of the first pole and the second pole and at least one of the third pole and the fourth pole and at least one of the first pole and the second pole is in electrical connection with at least one of the third pole and the fourth pole.

In a refinement, the power conditioning system includes a first power pole and a second power pole, the first pole is in electrical connection with the first power pole, the fourth pole is in electrical connection with the second power pole, the second pole is in electrical connection with the third pole, each of the at least one wireless receiver systems is associated with a load, and transmitting power to the at least one wireless receiver system includes proportionally transmitting power to the at least one wireless receiver system based a magnitude of each load associated with each of the at least one wireless receiver system.

In another refinement, a distributed capacitor is in electrical connection with the first transmission antenna and the second transmission antenna, the distributed capacitor including a first capacitor pole and a second capacitor pole, the power conditioning system includes a first power pole and a second power pole, the first pole is in electrical connection with the first power pole, the fourth pole is in electrical connection with the second power pole, the second pole is in electrical connection with the first capacitor pole, the third pole is in electrical connection with the second capacitor pole, transmitting power to the at least one wireless receiver system includes proportionally transmitting power to the at least one wireless receiver system based a magnitude of each load associated with each of the at least one wireless receiver system.

In another refinement, the power conditioning system includes a first power pole and a second power pole, the first pole and the third pole are in electrical connection with the first power pole, the second pole and the fourth pole are in electrical connection with the second power pole, and transmitting power to the at least one wireless receiver system includes transmitting substantially similar power to each load associated with each of the at least one wireless receiver system.

To that end, the systems, methods, and apparatus disclosed herein allow for two or more transmission antennas to be driven by the same transmitter amplifier in a substantially uniform and efficient way that enables efficient, single and/or simultaneous power transfer in a lower-cost manner that may limit a bill of materials.

In some such examples, such multiple antenna designs may provide a transmitting device with multiple "sub-areas" that either provide the benefit of a wider power transmission area or allow for multiple devices to be powered by a single transmission system.

By utilizing one or more of the systems, methods, and apparatus disclosed herein, transient current spikes and large changes in phase may be mitigated. Such mitigation may be advantageous for improvements in coil sensitivity, mass-manufacturability, and coil-to-coil efficiency.

In some further examples, utilizing one or more of the systems, methods, and apparatus disclosed herein, a system may experience an increase in coil-to-coil efficiency of about six percent and an impedance shift, due to metal, decreased by about 52 percent.

Additionally or alternatively, in some examples, utilizing one or more of the systems, methods, and apparatus disclosed herein can provide a robust, thin design that is, generally, manufacturable at a lower cost, when compared to devices with alternative components.

In some further examples thereof, utilizing one or more of the systems, methods, and apparatus disclosed herein may enable a system to be more mechanically durable, have a thinner form factor, and a lower cost, in comparison to legacy systems.

These and other aspects and features of the present disclosure will be better understood when read in conjunction with the accompanying drawings.

BRIEF DESCRIPTION OF THE DRAWINGS

FIG. 21 is a flow chart for an exemplary method for manufacturing a system for wireless transmission of one or more of electrical energy, electrical power, electrical electromagnetic energy, electronic data, and combinations thereof, in accordance with FIGS. 1-17 and the present disclosure.

FIG. 22 is a flow chart for an exemplary method for designing a wireless transmission system for the system of FIG. 21, in accordance with FIGS. 1-17, FIG. 21, and the present disclosure.

FIG. 23 is a flow chart for an exemplary method for designing a wireless receiver system for the system of FIG. 21, in accordance with FIGS. 1-17, FIG. 21, and the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
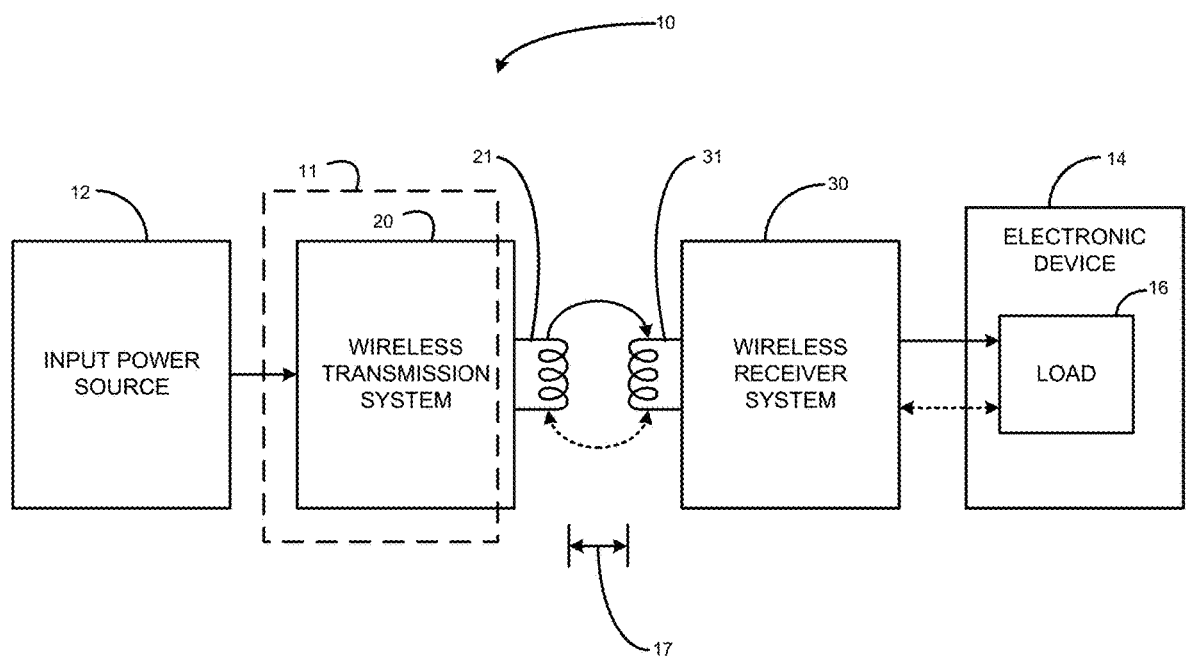
FIG. 1 is a block diagram of an embodiment of a system for wirelessly transferring one or more of electrical energy, electrical power, electromagnetic energy electronic data, and combinations thereof, in accordance with the present disclosure.

Referring now to the drawings and with specific reference to FIG. 1, a wireless electrical connection system 10 is illustrated. The wireless electrical connection system 10 provides for the wireless transmission of electrical signals, such as, but not limited to, electrical energy, electrical power, electromagnetic energy, and electronically transmittable data ("electronic data"). Specifically, the wireless electrical connection system 10 provides for the wireless transmission of electrical signals via near field magnetic coupling. As shown in the embodiment of FIG. 1, the wireless electrical connection system 10 includes a wireless transmission system 20 and a wireless receiver system 30. The wireless receiver system is configured to receive electrical energy, electrical power, electromagnetic energy, and/or electronic data from, at least, the wireless transmission system 20.

As illustrated, the wireless transmission system 20 and wireless receiver system 30 may be configured to transmit electrical energy, electrical power, electromagnetic energy, and/or electronically transmittable data across, at least, a separation distance or gap 17. Thus, the combination of the wireless transmission system 20 and the wireless receiver system 30 create an electrical connection without the need for a physical connection. "Electrical connection," as defined herein, refers to any facilitation of a transfer of an electrical current, voltage, and/or power from a first location, device, component, and/or source to a second location, device, component, and/or destination. To that end, an "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless electrical connection, such as, but not limited to, magnetic, electromagnetic, resonant, and/or inductive field, among other wireless electrical connections, connecting a first location, device, component, and/or source to a second location, device, component, and/or destination.

Alternatively, the gap 17 may be referenced as a "Z-Distance," because, if one considers an antenna 21, 31 to be disposed substantially along a common X-Y plane, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

To that end, the wireless power system 10 operates when the wireless transmission system 20 and the wireless receiver system 30 are coupled. As defined herein, the terms "couples," "coupled," and "coupling" generally refers to magnetic field coupling, which occurs when the energy of a transmitter and/or any components thereof and the energy of a receiver and/or any components thereof are coupled to each other through a magnetic field. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB or mp3 ports and/or adaptors, among other contemplated electrical components).

Electrical energy received by the wireless transmission system 20 is then used for at least two purposes: providing electrical power to internal components of the wireless transmission system 20 and providing electrical power to the transmitter antenna 21. The transmitter antenna 21 is configured to wirelessly transmit the electrical signals conditioned and modified for wireless transmission by the wireless transmission system 20 via near-field magnetic coupling (NFMC). Near-field magnetic coupling enables the transfer of electrical energy, electrical power, electromagnetic energy, and/or electronically transmissible data wirelessly through magnetic induction between the transmitter antenna 21 and a receiving antenna 31 of, or associated with, the wireless receiver system 30. Accordingly, near-field magnetic coupling may enable "inductive coupling," which, as defined herein, is a wireless power transmission technique that utilizes an alternating electromagnetic field to transfer electrical energy between two antennas. Accordingly, such inductive coupling is the near field wireless transmission of electrical energy between two magnetically coupled coils that are tuned to resonate at a similar frequency. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmitter antenna 21 or the receiver antenna 31 are strategically positioned to facilitate reception and/or transmission of wirelessly transferred electrical energy, power, electromagnetic energy and/or data through near field magnetic induction. Antenna operating frequencies may comprise all operating frequency ranges, examples of which may include, but are not limited to, about 110 kHz to about 205 kHz (Qi interface standard), 100 kHz to about 350 kHz (PMA interface standard), 6.78 MHz (Rezence interface standard and/or any other proprietary interface standard operating at a frequency of 6.78 MHz), 13.56 MHz (Near Field Communications (NFC) standard, defined by ISO/IEC standard 18092), 27 MHz and/or, alternatively, at an operating frequency of another proprietary operating mode. To that end, the operating frequencies of the antennas 21, 31 may be operating frequencies designated by the International Telecommunications Union (ITU) in the Industrial, Scientific, and Medical (ISM) frequency bands, which include, but is not limited to including, 6.78 MHz, 13.56 MHz, and 27 MHz, which are designated for use in wireless power transfer. In addition, the transmitting antenna and/or the receiving antenna of the present disclosure may be designed to transmit or receive, respectively, over a wide range of operating frequencies on the order of about 1 kHz to about 1 GHz or greater, in addition to the Qi, PMA, Rezence, and NFC interface standards. In addition, the transmitting antenna and the receiving antenna of the present disclosure may be configured to transmit and/or receive electrical power having a magnitude that ranges from about 10 mW to about 500 W. In one or more embodiments the inductor coil of the transmitting antenna 21 is configured to resonate at a transmitting antenna resonant frequency or within a transmitting antenna resonant frequency band. As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments the transmitting antenna resonant frequency is at least 1 kHz. In one or more embodiments the transmitting antenna resonant frequency band extends from about 1 kHz to about 100 MHz. In one or more embodiments the inductor coil of the receiving antenna 31 is configured to resonate at a receiving antenna resonant frequency or within a receiving antenna resonant frequency band. In one or more embodiments the receiving antenna resonant frequency is at least 1 kHz. In one or more embodiments the receiving antenna resonant frequency band extends from about 1 kHz to about 100 MHz.

The wireless receiver system 30 may be associated with at least one electronic device 14, wherein the electronic device 14 may be any device that requires electrical power for any function and/or for power storage (e.g., via a battery and/or capacitor). Additionally or alternatively, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless electrical connection, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30. While the systems and methods herein illustrate the transmission of wirelessly transmitted energy, wirelessly transmitted power, wirelessly transmitted electromagnetic energy, and electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
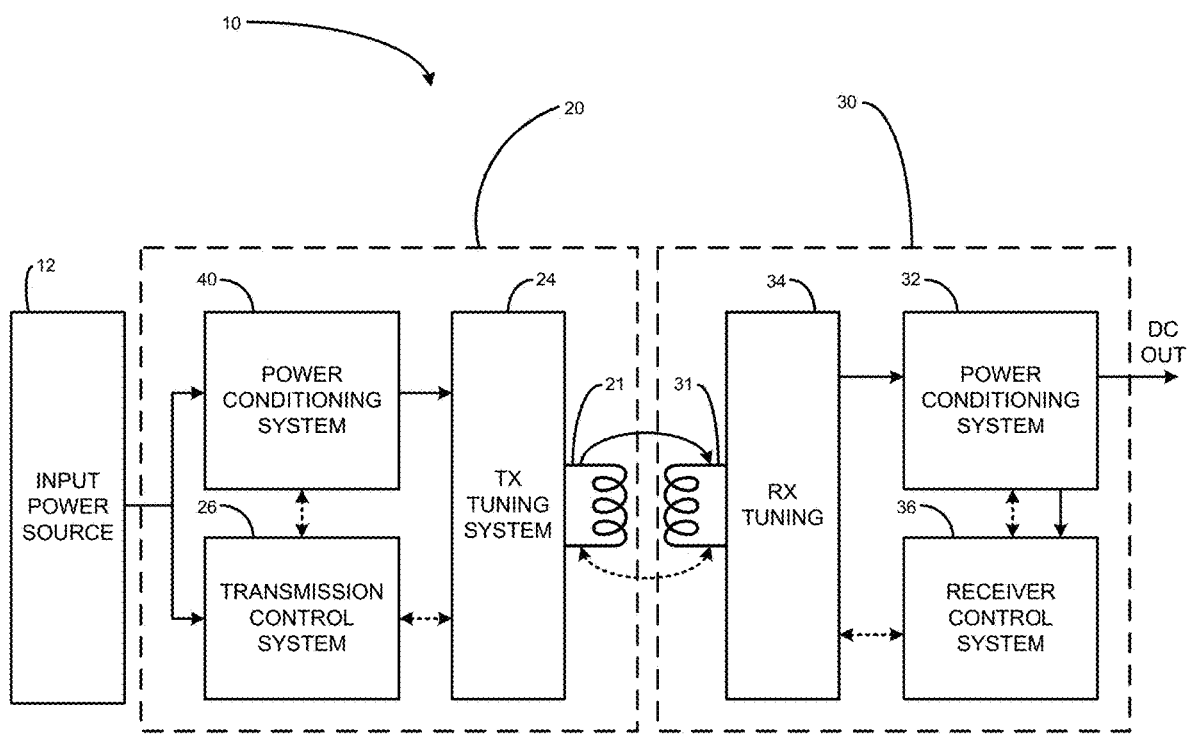
FIG. 2 is a block diagram illustrating components of a wireless transmission system of the system of FIG. 1 and a wireless receiver system of the system of FIG. 1, in accordance with FIG. 1 and the present disclosure.

Turning now to FIG. 2, the wireless connection system 10 is illustrated as a block diagram including example subsystems of both the wireless transmission system 20 and the wireless receiver system 30. As illustrated, the wireless transmission system 20 may include, at least, a power conditioning system 40, a transmission control system 26, a transmission tuning system 24, and the transmission antenna 21. As illustrated, a first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 3:
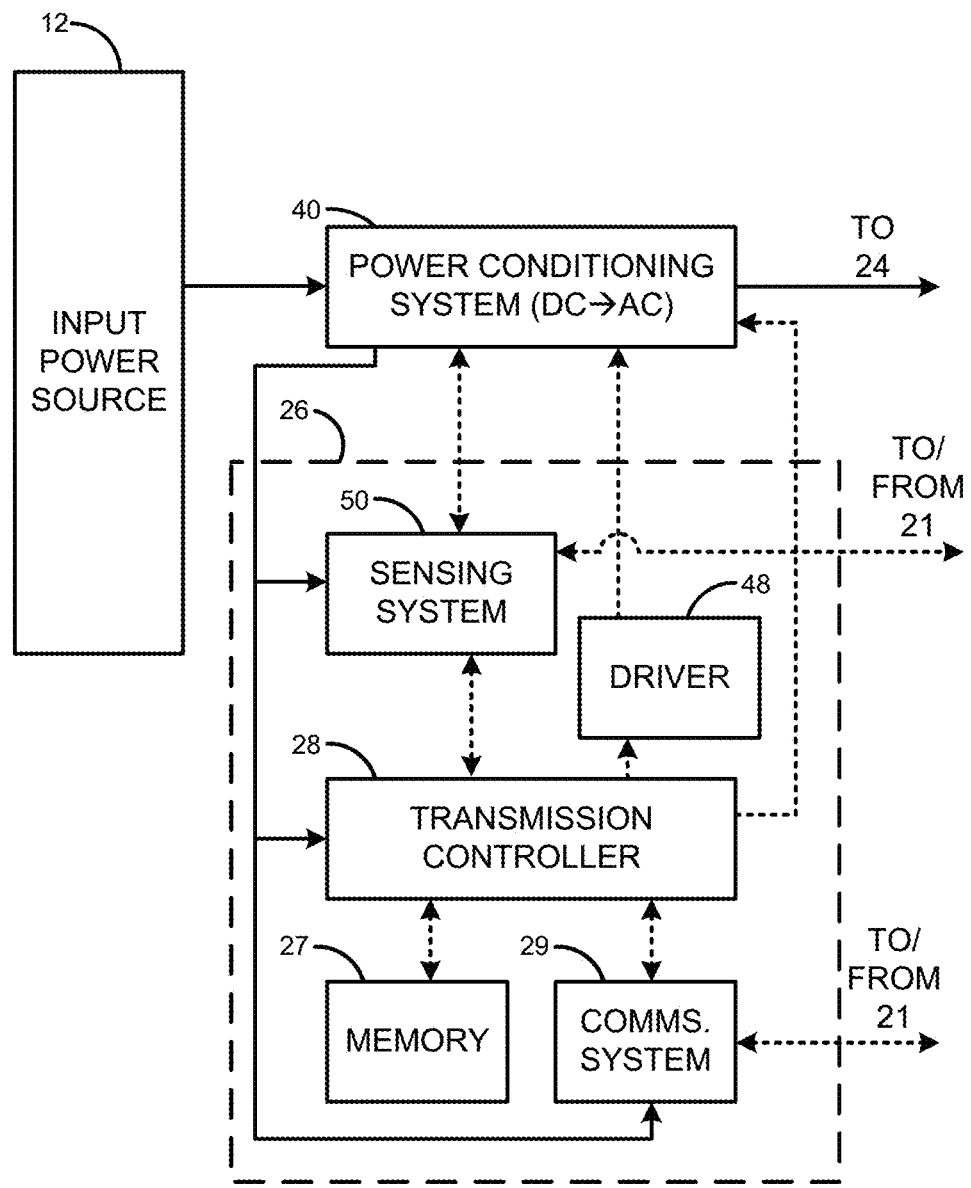
FIG. 3 is a block diagram illustrating components of a transmission control system of the wireless transmission system of FIG. 2, in accordance with FIG. 1, FIG. 2, and the present disclosure.

Referring now to FIG. 3, with continued reference to FIGS. 1 and 2, subcomponents and/or systems of the transmission control system 26 are illustrated. The transmission control system 26 may include, but is not limited to, including a sensing system 50, a transmission controller 28, a communications system 29, a driver 48, and a memory 27. The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

Further, while particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
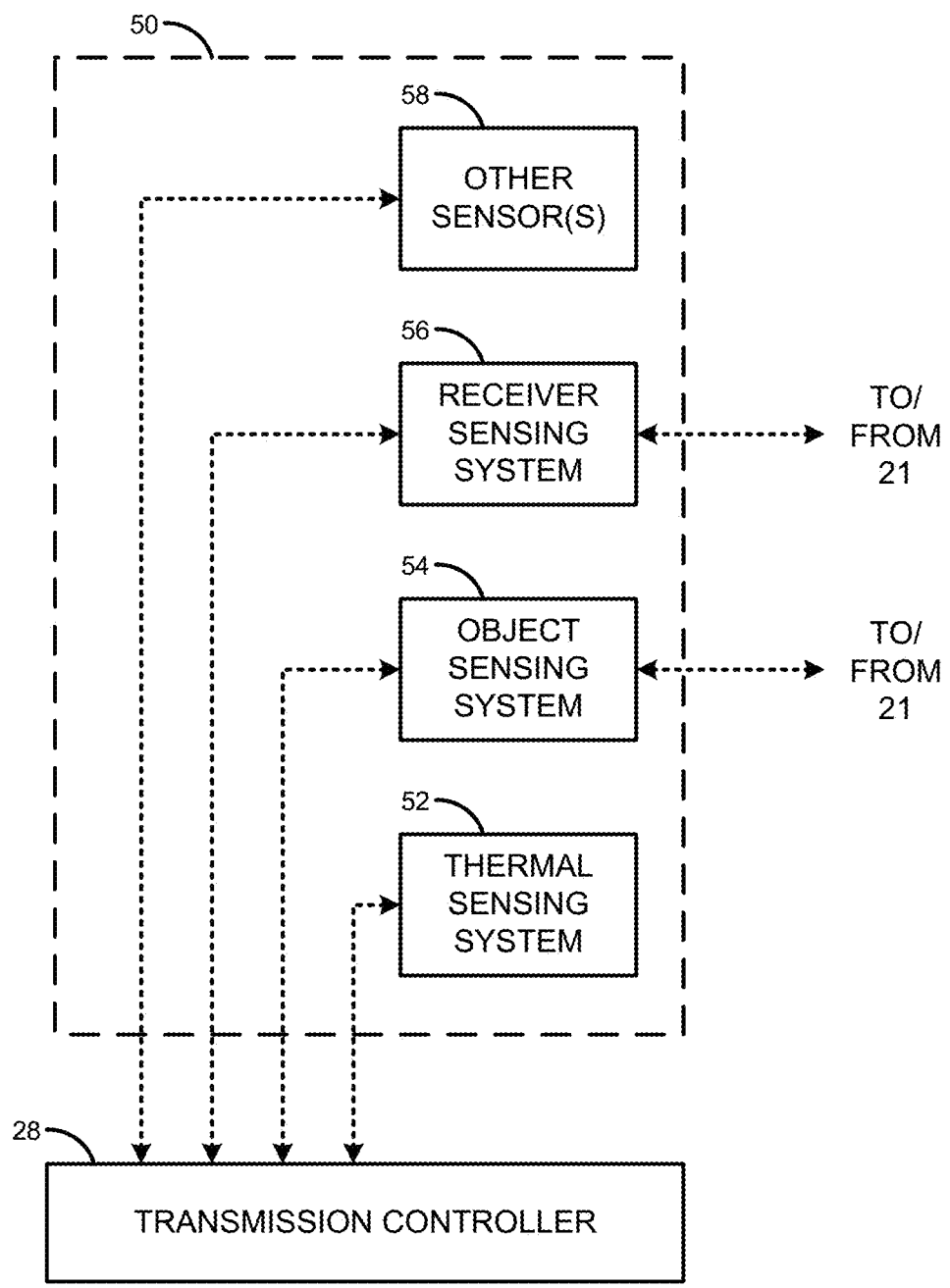
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may further be a foreign object detection (FOD) system. Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C.) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values. Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, if the presence of any such wireless receiving system is detected, wireless transmission of electrical energy, electrical power, electromagnetic energy, and/or data by the wireless transmission system 20 to said wireless receiving system is enabled. Further, in some examples, if the presence of a wireless receiver system is not detected, wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
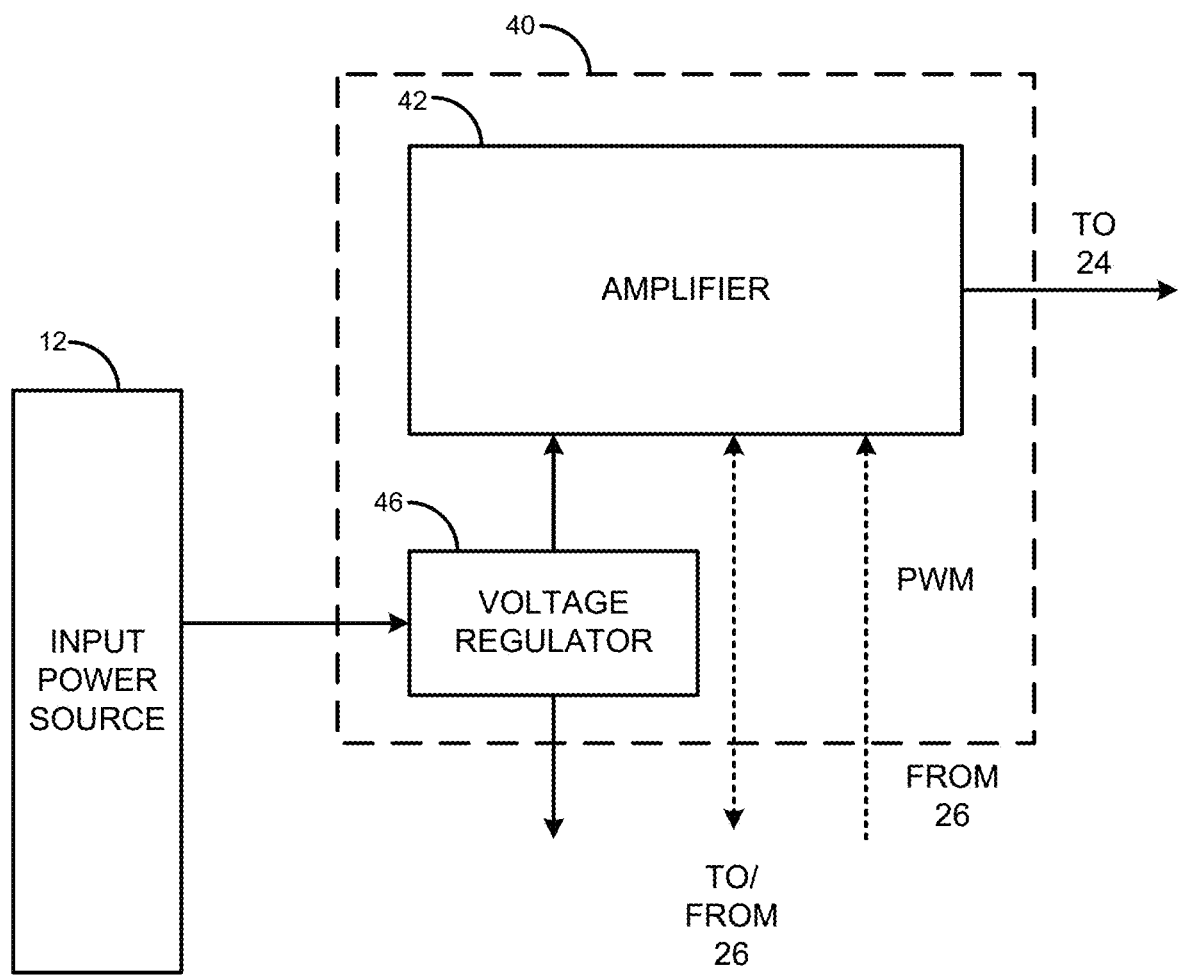
FIG. 5 is a block diagram illustrating components of a power conditioning system of the wireless transmission system of FIG. 2, in accordance with FIG. 1, FIG. 2, and the present disclosure.

Referring now to FIG. 5, and with continued reference to FIGS. 1-4, a block diagram illustrating a first embodiment of the power conditioning system 40 is illustrated. At the power conditioning system 40, electrical power is received, generally, as a direct current (DC) power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 21. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an alternating current (AC) as output, based, at least in part, on PWM input from the transmission control system 26. To that end, the amplifier 42 may be or include, for example, a power stage inverter, such as a dual field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W.

In some non-limiting examples, the amplifier 42 may be or may include one or more class-E power amplifiers. Class-E power amplifiers are efficiently tuned switching power amplifiers designed for use at high frequencies (e.g., frequencies from about 1 MHz to about 1 GHZ). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, among other amplifiers that could be included as part of the amplifier 42.

Returning now to FIG. 2, the conditioned signal(s) from the power conditioning system 40 is then received by the transmission tuning system 24, prior to transmission by the antenna. The transmission tuning system 24 may include any tuning, impedance matching, filters (e.g. a low pass filter, a high pass filter, a "pi" or "TT" filter, a "T" filter, an "L" filter, a "LL" filter, an L-C trap filter, among other filters), network matching, sensing, and/or conditioning elements configured to optimize wireless transfer of signals from the wireless transmission system 20 to the wireless receiver system 30. For example, the transmission tuning system 24 may include a filter 60, such as the illustrated low pass filter comprised of $L_F$ and $C_F$. Further, the transmission tuning system 24 may include an impedance matching circuit, which is designed to match impedance with a corresponding wireless receiver system 30 for given power, current, and/or voltage requirements for wireless transmission of one or more of electrical energy, electrical power, electromagnetic energy, and electronic data.

Figure 6:
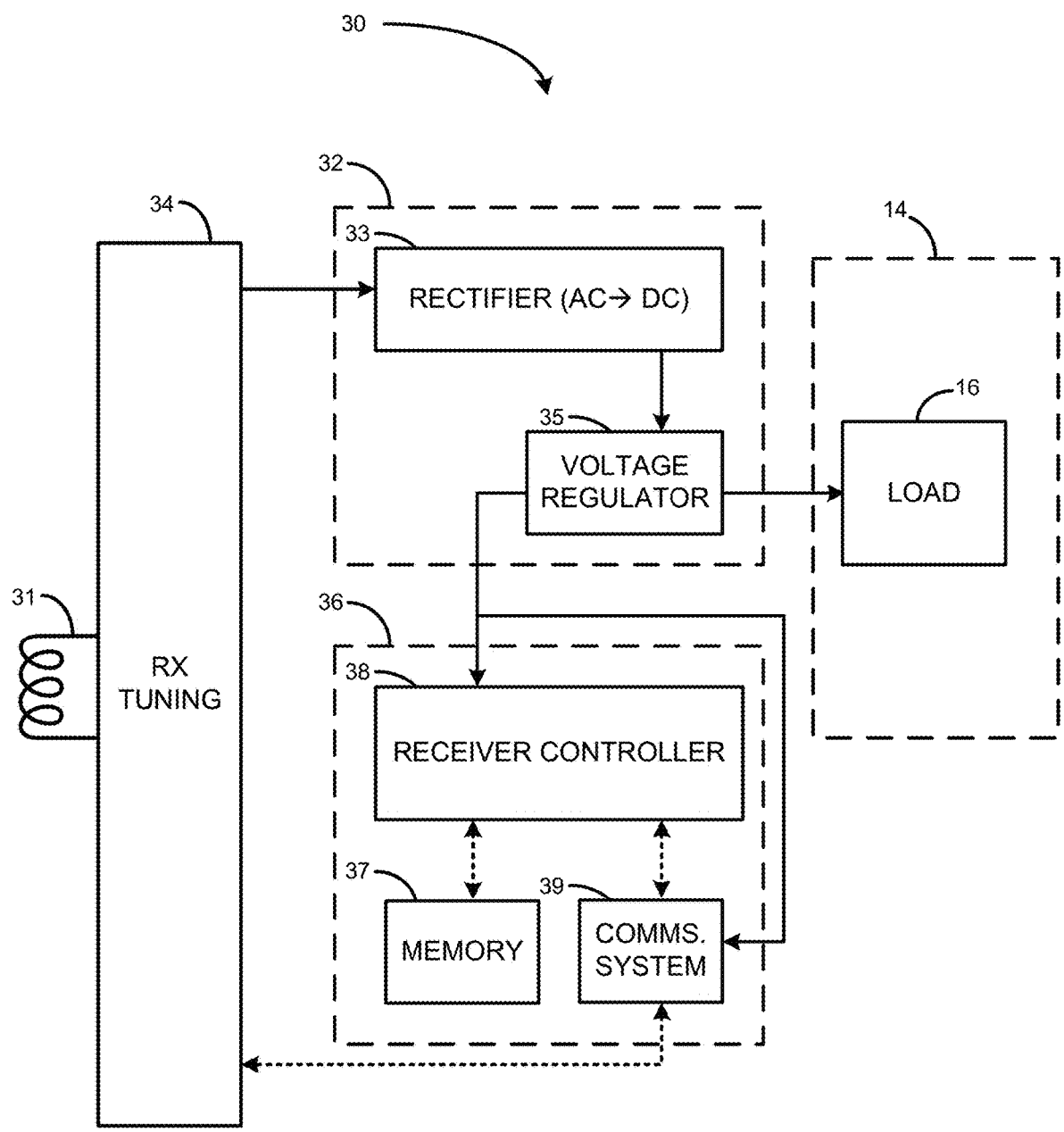
FIG. 6 is a block diagram illustrating components of a receiver control system and a receiver power conditioning system of the wireless receiver system of FIG. 2, in accordance with FIG. 1, FIG. 2, and the present disclosure.

Turning now to FIG. 6 and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As best illustrated in FIG. 6, the wireless receiver system 30 includes, at least, the receiver antenna 31, a receiver tuning system 34, a power conditioning system 32, and a receiver control system 36. The receiver tuning system 34 may be configured to substantially match the electrical impedance of the wireless transmission system 20. In some examples, the receiver tuning system 34 may be configured to dynamically adjust and substantially match the electrical impedance of the receiver antenna 31 to a characteristic impedance of the power generator or the load at a driving frequency of the transmission antenna 20.

As illustrated, the power conditioning system 32 includes a rectifier 33 and a voltage regulator 35. In some examples, the rectifier 33 is in electrical connection with the receiver tuning system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a controlled rectifier, an uncontrolled rectifier, and a half controlled rectifier. As electronic devices may be sensitive to voltage, additional protection of the electronic device may be provided by clipper circuits or devices. The rectifier 33 may further include a clipper circuit or a clipper device. A clipper is herein defined as a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a shunt linear voltage regulator, a step up switching voltage regulator, a step down switching voltage regulator, an inverter voltage regulator, a Zener controlled transistor series voltage regulator, and an emitter follower voltage regulator. The voltage regulator 35 may further include a voltage multiplier. A voltage multiplier is herein defined as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may be a low dropout linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 and/or other components of the electronic device 14.

The receiver control system 36 may include, but is not limited to, including a receiver controller 38, a communications system 39, and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30, and/or performs any other computing or controlling task desired. The receiver controller 38 may be a single controller or may include more than one controller disposed to control various functions and/or features of the wireless receiver system 30. Functionality of the transmission controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as independent components and/or circuits (e.g., the memory 37, the communications system 39, among other contemplated elements) of the receiver control system 36, such components may be integrated with the receiver controller 38. In some examples, the receiver controller 38 may be and/or include one or more integrated circuits configured to include functional elements of one or both of the receiver controller 38 and the wireless receiver system 30, generally. "Integrated circuits," as defined herein, generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the communications system 39 may be a dedicated circuit configured to send and receive data at a given operating frequency. For example, the communications system 39 may be a tagging or identifier integrated circuit, such as, but not limited to, an NFC tag and/or labelling integrated circuit. Examples of such NFC tag and/or labelling integrated circuits include the NTAG® family of integrated circuits manufactured by NXP Semiconductors N.V. Additionally or alternatively, the communications system 39 may include Bluetooth® communications components, WiFi communications components, TransferJet™ communications components, among other contemplated out of band communications components. However, the communications system 39 is certainly not limited to these example components and, in some examples, the communications system 39 may be implemented with another integrated circuit (e.g., integrated with the receiver controller 38), may be another transceiver of or operatively associated with one or both of the electronic device 14 and the wireless receiver system 30, among other contemplated communication systems and/or apparatus. Further, in some examples, functions of the communications system 39 may be integrated with the receiver controller 39, such that the controller modifies the inductive field between the antennas 21, 31 to communicate in the frequency band of wireless power transfer operating frequency.

Figure 7:
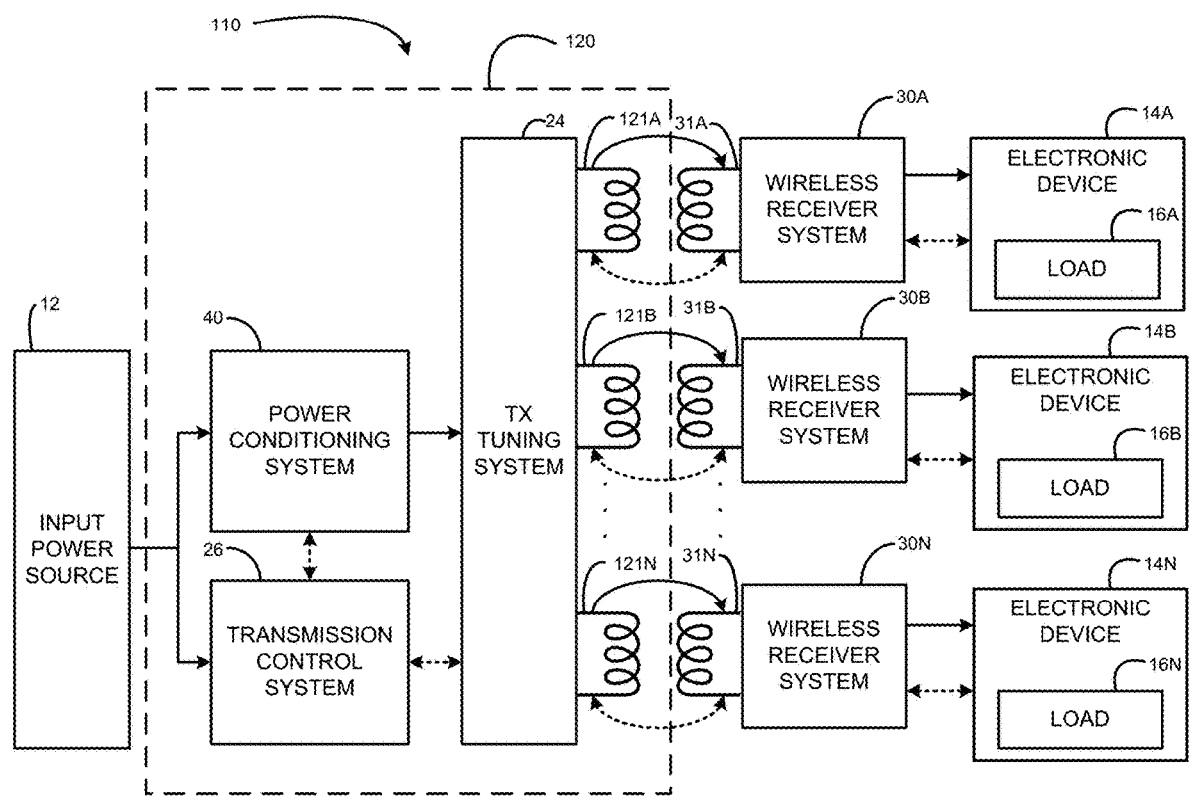
FIG. 7 is a block diagram for an embodiment of a system for wirelessly transferring one or more of electrical energy, electrical power, electromagnetic energy electronic data, and combinations thereof, the system including common or similar elements to those of FIGS. 1-7, in accordance with the present disclosure.

Referring now to FIG. 7, and with continued reference to one or more of FIGS. 1-6, an embodiment of a system 110 for wireless transfer of one or more of electrical energy, electrical power, electromagnetic energy, and electronically transmissible data is illustrated. As indicated by the reference numbers, the wireless transmission system 120 may include substantially similar, identical, and/or analogous elements to those of FIGS. 1-6, as indicated by common reference numbers. Alternatively, functionally comparable components, which perform one or more similar functions to another described component, but have distinguishing characteristics, are denoted by three-digit numbers, wherein the most significant digit indicates a "series" for the current embodiment and the two least significant digits correspond to the earlier described component. "Functionally corresponds," as defined herein, means that the two or more components perform a similar function within the context of their respective, broader system, method, and/or apparatus. For example, in describing the wireless transmission system 120, the most significant digit "1" indicates the series for the embodiment of FIG. 7 and the two least significant digits, "20," indicate that the wireless receiver system functionally corresponds to the earlier described wireless transmission system 20. To that end, the wireless transmission system 120 functionally corresponds with the wireless transmission system 20 because both of the systems 20, 120 are configured to transmit one or more of electrical energy, electrical power, electromagnetic energy, and electronically transmissible data to the wireless receiver system(s) 30.

As illustrated, the system 110 includes a wireless transmission system 120, operatively associated with the input power source 12, which includes the power conditioning system 40, the transmission control system 26, the transmission tuning system 24, and a plurality of transmission antennas 121A-N. As illustrated, the wireless transmission system 120 may include two or more transmission antennas 121A, 121B up to a total of "n" transmission antennas 121N. Each of the wireless receiver antennas 121A-N may be connected commonly to the single power conditioning system 40. The system 110 further includes one or more wireless receiver systems 30A-N, each being associated with a load 16A-N of an electronic device 16A-N. As illustrated, the system 110 may include two or more wireless receiver systems 30A, 30B, up to a total of "n" wireless receiver systems 30N. While it is illustrated that each wireless transmission antenna 121A-N is operatively associated with a wireless receiver antenna 31A-N, it is certainly contemplated that the wireless transmission system 120 may be operatively associated with only one receiver antenna 30, such that the multiple transmission antennas 121A-N creates a larger field coupling area to transfer power to the wireless receiver system 30. Alternatively, while FIG. 7 is illustrated with each transmission antenna 121A-N operatively associated and/or coupled with a single receiver antenna 30, it is certainly contemplated that a single transmission antenna 121 may be operatively associated and/or operatively coupled with one or more receiver antennas 30, up to "n" receiver antennas 30N.

In wireless power transfer systems, wherein a high resonant frequency is required, the size of an antenna may be, relatively, limited when compared to lower frequency solutions, due to self-resonant frequency, coil sensitivity, amplifier driving capabilities, and/or low coupling efficiency concerns. In some applications, such as, but not limited to, wireless power transfer systems in which a resonant frequency is above about 5 MHZ, these issues may make it difficult for antenna designers to create proper coils having a two-dimensional area greater than, about 200 mm by 200 mm. However, using similarly sized antennas, but coupling each of these similar antennas to a common power amplifier/ power system (e.g., the power conditioning system 40) may allow for larger power transfer areas and/or power transfer areas for multiple devices, coupled at higher resonant frequencies. Such designs allow for a system having two or more transmission antennas that are driven by the same transmitter power amplifier in a uniform and efficient way that enables efficient, single and/or simultaneous power transfer in a lower-cost manner that may limit a bill of materials. Additionally, using such designs may provide additional benefits, such as, but not limited to, increasing a coupling area of the wireless transmission system 120, optimized electromagnetic interference (EMI) performance versus single antenna designs, among other things.

In view of the system 110 of FIG. 7 and the embodiments described below, such multiple antenna designs may provide a transmitting device with multiple "sub-areas" that either provide the benefit of a wider power transmission area or allow for multiple devices to be powered by a single transmission system. Accordingly, different connection schema, of the antennas to a common power amplifier, have different advantages and disadvantages. In particular, these advantages versus disadvantages can be seen when comparing the benefits of a series antenna-to-amplifier connection (see, for example, FIGS. 8-14) to the benefits of a parallel antenna-to-amplifier connection (see, for example, FIG. 15). For example, a series antenna-to-amplifier connection may be advantageous when the coil has a lower output current requirement, versus a parallel antenna-to-amplifier connection. Alternatively, a parallel antenna-to-amplifier arrangement may be advantageous when powering multiple loads at a common power level and rate of transfer.

FIGS. 8-14 illustrate various configurations of series connected antennas to a common power conditioning system and/or amplifier. Such series connections are best suited for any wireless power transfer scenarios (e.g., charging a battery, capacitor, load, etc. and direct power transfer applications), as the transfer impedances induced by a receiver antenna's load to the power amplifier is added, rather than divided (as is the case with a parallel configuration).

Figure 8A:
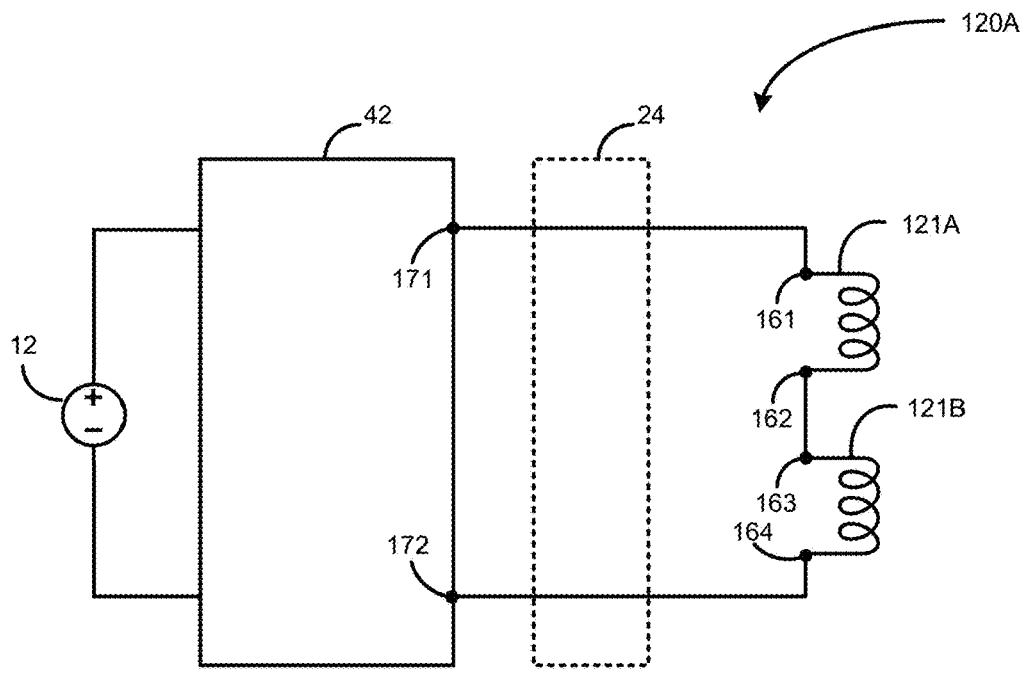
FIG. 8A is an electrical schematic diagram of a first embodiment of a wireless transmission system of the system of FIG. 7, illustrating an antenna configuration of the wireless transmission system, in accordance with FIG. 7 and the present disclosure.
Figure 8B:
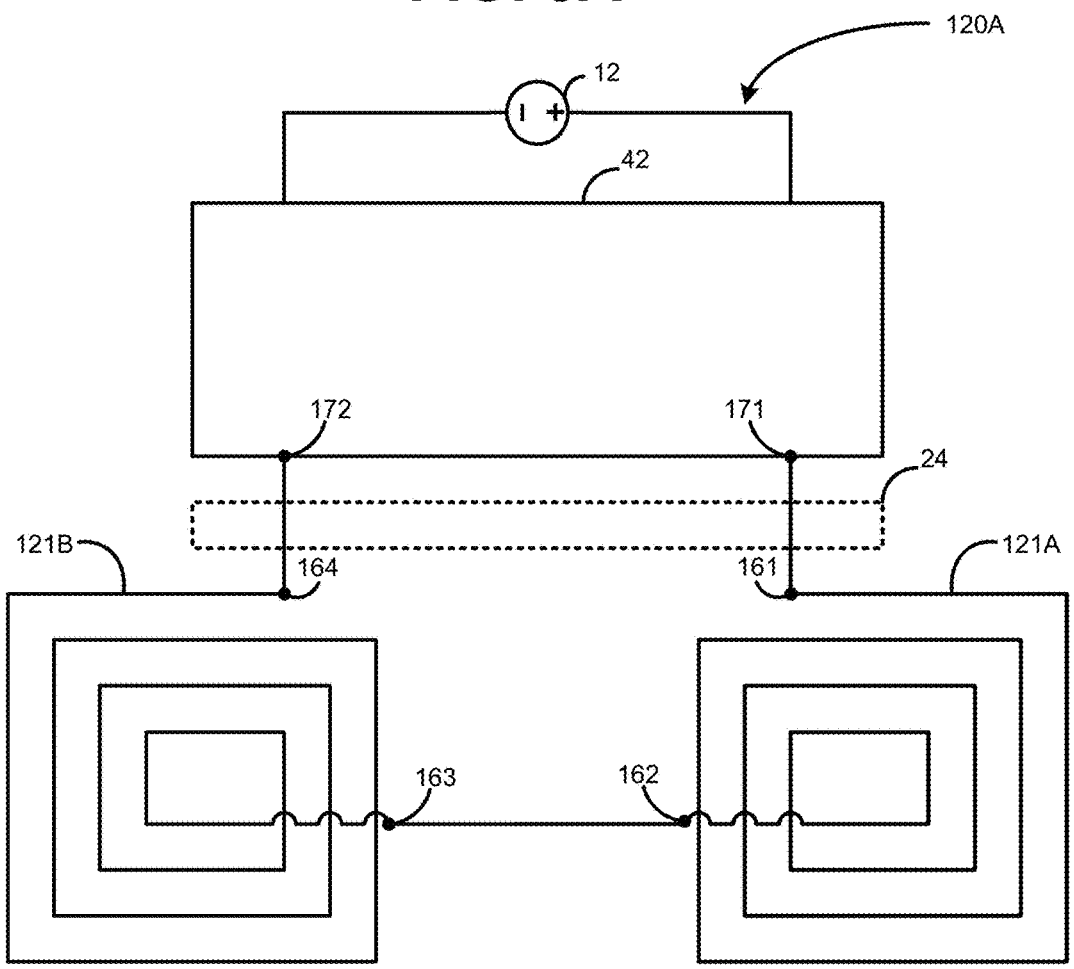
FIG. 8B is another schematic diagram of the first embodiment of the wireless wireless transmission system, in accordance with FIG. 7, FIG. 8A, and the present disclosure.

Turning now to FIGS. 8A-B and with continued reference to FIG. 7, a schematic diagram of a wireless transmission system 120A is illustrated. As illustrated in FIGS. 8A-B and, similarly, in the later illustrated embodiments of the wireless transmission system 120A, the first transmission antenna 121A includes a first pole 161 and a second pole 162, second transmission antenna 121B includes a third pole 163 and a fourth pole 164, and the amplifier 42 includes a first power pole 171 and a second power pole 172. As illustrated, to achieve the series antenna-to-amplifier connection, the first pole 161 of the first transmission antenna 121A is in electrical connection with the first power pole 171, the fourth pole of the second transmission antenna 121B is in electrical connection with the second power pole 172, and the second pole 162 of the first transmission antenna 121A is in electrical connection with the third pole 163 of the second receiver antenna 121B, thereby establishing the series connection between the receiver antennas 121A, 121B, with respect to the amplifier 42.

Figure 9A:
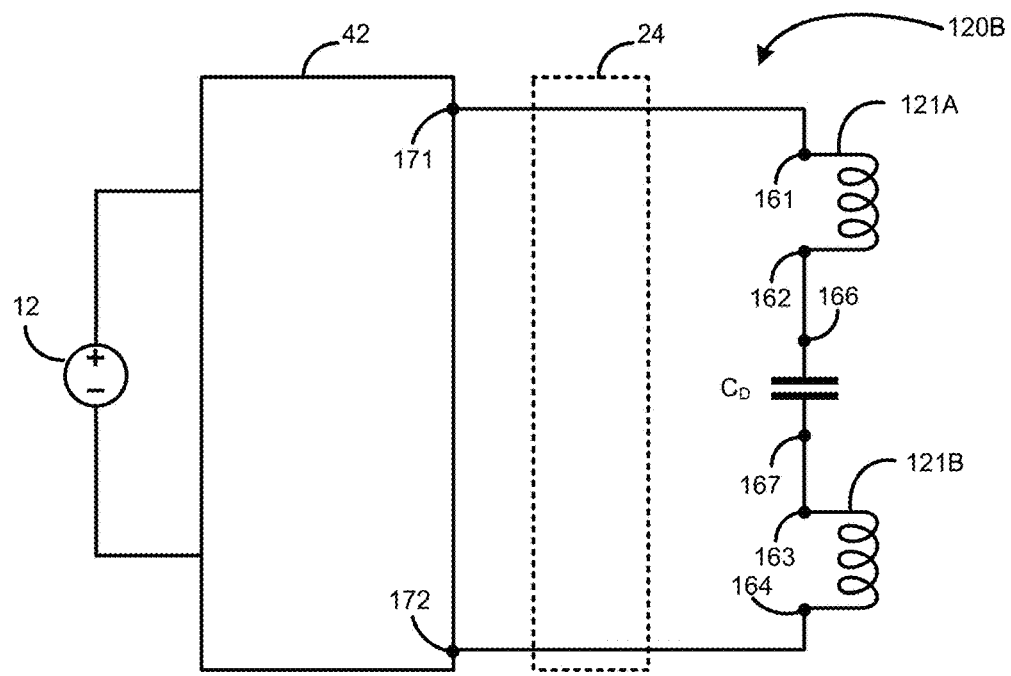
FIG. 9A is an electrical schematic diagram of a second embodiment of a wireless transmission system of the system of FIG. 7, illustrating an antenna configuration of the wireless transmission system, in accordance with FIG. 7 and the present disclosure.
Figure 9B:
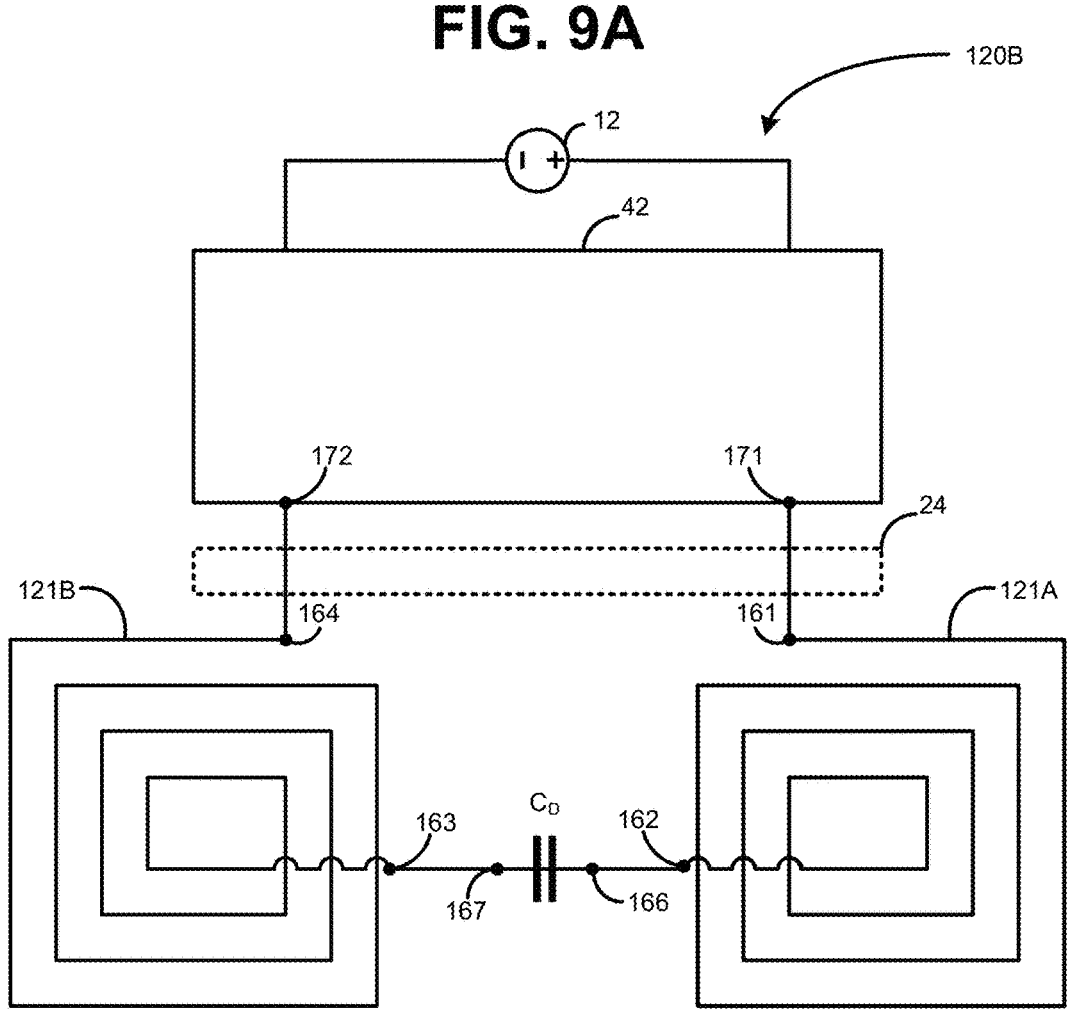
FIG. 9B is another schematic diagram of the second embodiment of the wireless transmission system of the system of FIG. 7, illustrating the antenna configuration of the wireless transmission system, in accordance with FIG. 7, FIG. 9A, and the present disclosure.

FIGS. 9A-B illustrate another embodiment of the wireless transfer system 120B, wherein a distributed capacitor CD is included, in series connection between the first transmission antenna 121A and the second transmission antenna 121B. In such examples, the $C_D$ includes a first capacitor pole 166 and a second capacitor pole 167. As illustrated, to achieve the series antenna-to-amplifier connection, with $C_D$ disposed therebetween, the first pole 161 of the first transmission antenna 121A is in electrical connection with the first power pole 171, the fourth pole 164 of the second transmission antenna 121B is in electrical connection with the second power pole 172, the second pole 162 is in electrical connection with the first capacitor pole 166, and the third pole 163 is in electrical connection with the second capacitor pole 167.

By disposing $C_D$ in series connection between the first and second transmission antennas 121A, 121B, transient current spikes and large changes in phase may be mitigated. Such transient current spikes and changes in phase may cause current sensitivity issues, difficulties in manufacturing, and/or coil-to-coil efficiency degradation between multiple transmission antennas 121. Thus, mitigation via inclusion of $C_D$ may be advantageous for improvements in coil sensitivity, mass-manufacturability (for example, coil consistency from unit to unit, tolerance for materials and process differences across multiple manufacturing lots, among other things), and coil-to-coil efficiency. To that end, experimental results have indicated that inclusion of $C_D$ causes an increase in coil-to-coil efficiency of about six percent and an impedance shift, due to metal, decreased by about 52 percent. Such increases in efficiency and decreases in impedance shift may be particularly advantageous in transmission antenna 121 designs wherein a, relatively, small transmission antenna 121 has expanded requirements for coupling Z-distance.

Additionally, inclusion of $C_D$, in series connection between the first and second transmission antennas 121A, 121B, aids in isolating communications for each transmission antenna 121A-N, by limiting interference. For example, if two transmission antennas 121A, 121B are coupled with two wireless receiver systems 30A, 30B, $C_D$ may prevent interference in communications signals that are transmitted by the wireless receiver systems 30A, 30B, via communications within the frequency band of the operating frequency of one or both of the receiver antennas 121A, 121B.

Figure 10:
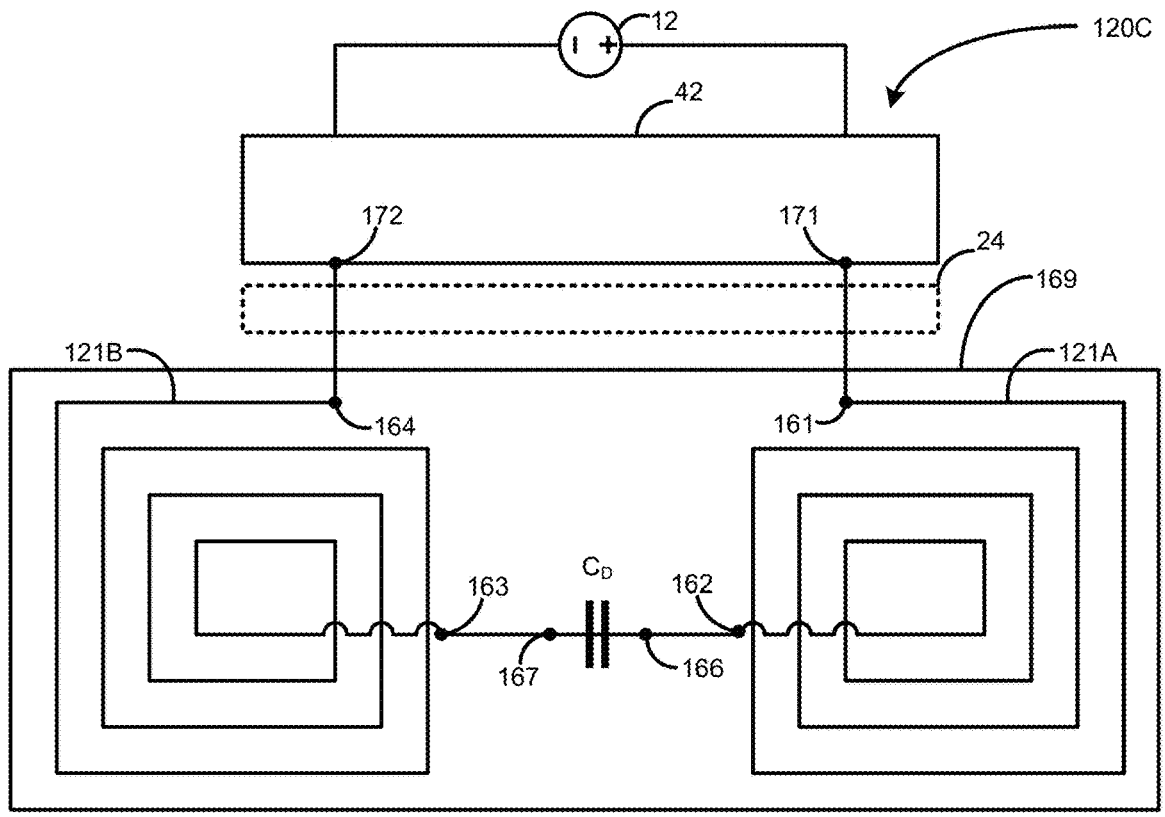
FIG. 10 is a schematic diagram of a third embodiment of a wireless transmission system of the system of FIG. 7, illustrating an antenna configuration of the wireless transmission system, in accordance with FIG. 7 and the present disclosure.

FIG. 10, in view of FIGS. 9A-B, illustrates a further embodiment of a system 120C, in which $C_D$ is implemented as a component on a printed circuit board (PCB) 169, upon which one or both of the first and second transmission antennas 121A, 121B are disposed. By utilizing the PCB 169 having $C_D$ thereon, case in bill of materials may be improved. Further, in such examples, both of the first and second transmission antennas 121A, 121B may be printed on the same substrate of the PCB 169 and the receiver antennas 121A, 121B may be, therefore, internally connected to each other through $C_D$, wherein, in such examples, $C_D$ is a surface mount capacitor on the PCB 169. In comparison to other designs, this configuration may reduce antenna complexity by reducing the number of connections to the amplifier 42, which simplifies the manufacture of the receiver antennas 121A, 121B. Accordingly, in such examples, the transmission antennas 121A, 121B and $C_D$ are all functionally coupled with the PCB 169. As defined herein, "functionally coupled" means that the antennas 121A, 121B and $C_D$ are coupled with the PCB 169, at least, when they are able to function, for the purposes of the system 120.

Referring again to the PCB 169, it will be understood to those skilled in the art that PCB 169 may be a single layer or multi-layer. A multi-layer PCB may further comprise surface and embedded circuit traces, and may also include through-hole, surface mount and/or embedded components and or component circuits. Typical PCB substrate materials may include fiberglass, FR4, a ceramic, among others. In some examples the PCB 169 may further be or include a flexible printed circuit board (FPCB).

Figure 11:
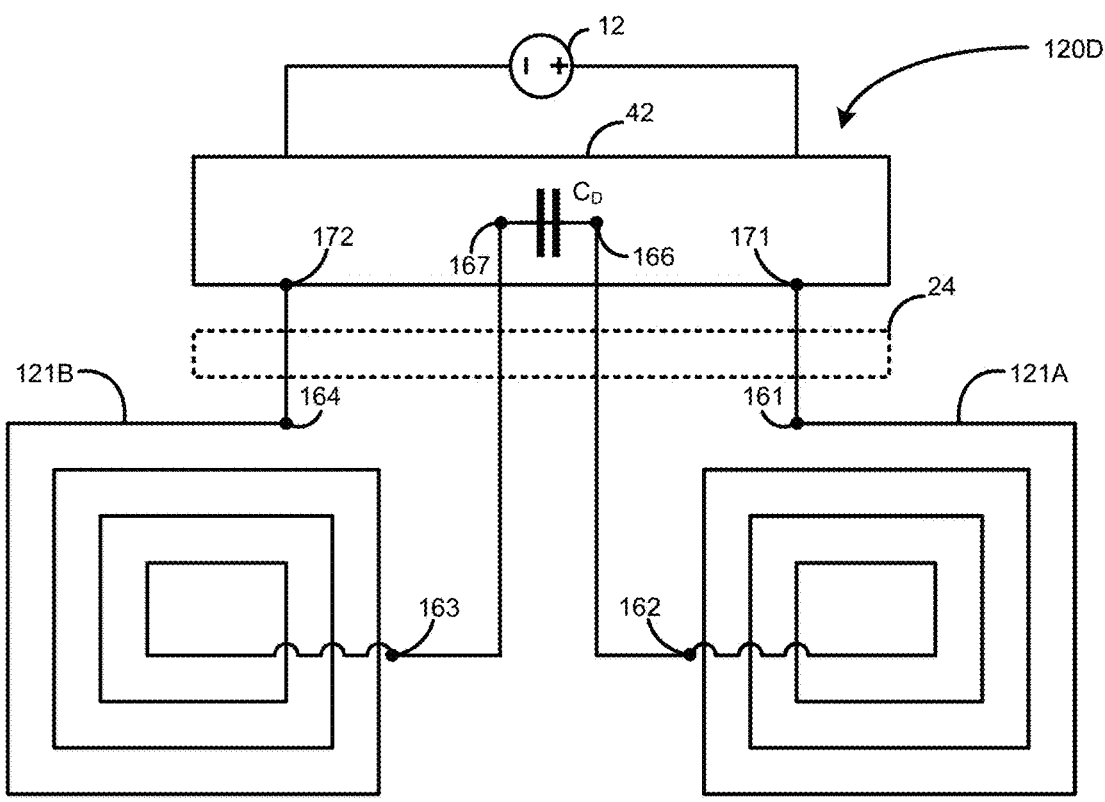
FIG. 11 is a schematic diagram of a fourth embodiment of a wireless transmission system of the system of FIG. 7, illustrating an antenna configuration of the wireless transmission system, in accordance with FIG. 7 and the present disclosure.

Turning now to FIG. 11, and with continued reference to FIG. 9, another embodiment of a wireless transmission system 120D is illustrated, wherein CD is disposed as part of the amplifier 42 and/or the broader power conditioning system 40. In such examples, the connection to the amplifier 42 is, thusly, a four-port connection, rather than a two-port connection, as in the embodiments of FIGS. 8-10. In such examples, the first and second capacitor poles 166, 167 are ports on the amplifier 42. By including $C_D$ as a functioning component of the amplifier 42, an output current of the amplifier 42 may enter the first receiver antenna 121A, return to the amplifier 42 via the first capacitor pole 166, pulling back the phase of the power signal, enters the second receiver antenna 121B, then return to the amplifier at the second power pole 172.

Figure 12A:
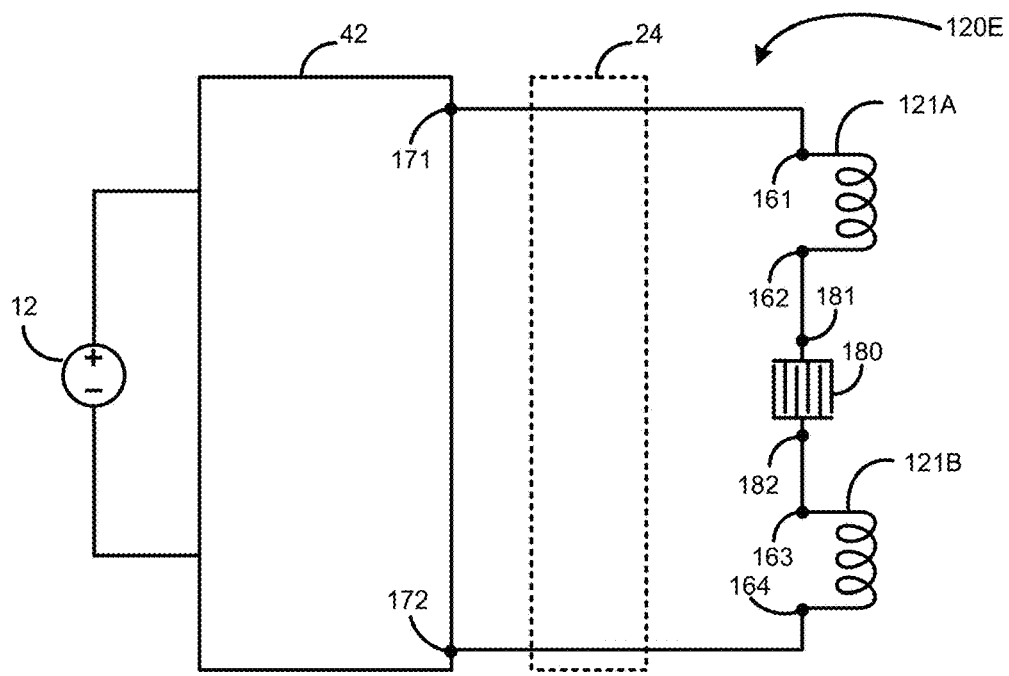
FIG. 12A is an electrical schematic diagram of a fifth embodiment of a wireless transmission system of the system of FIG. 7, illustrating an antenna configuration of the wireless transmission system, in accordance with FIG. 7 and the present disclosure.
Figure 12B:
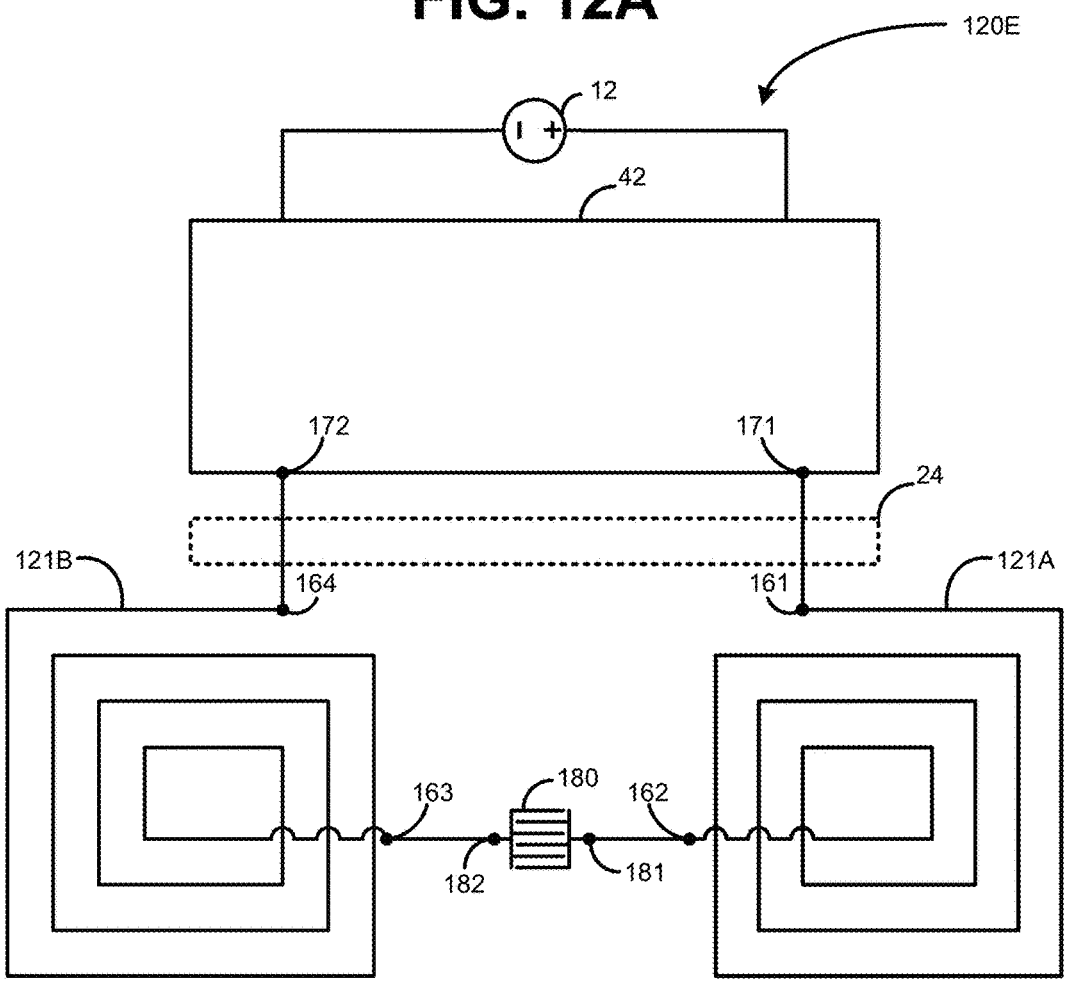
FIG. 12B is another schematic diagram of the fifth embodiment of the wireless transmission system of the system of FIG. 7, illustrating the antenna configuration of the wireless transmission system, in accordance with FIG. 7, FIG. 12A, and the present disclosure.

FIGS. 12A-B, with continued reference to FIG. 8, illustrate another embodiment of a wireless transmission system 120E, wherein the wireless transmission system 120E further includes an interdigitated capacitor 180 in electrical connection with the first transmission antenna 121A and the second transmission antenna 121B. The interdigitated capacitor 180 includes, at least, a first capacitor pole 181 and a second capacitor pole 182. As illustrated, the first pole 161 of the first antenna 121A is in electrical connection with the first power pole 171, the fourth pole 164 of the second antenna 121B is in electrical connection with the second power pole 172, the second pole of the first transmission antenna 121A is in electrical connection with the first capacitor pole 181 of the interdigitated capacitor 180, and the third pole 163 of the second transmission antenna 121B is in electrical connection with the second capacitor pole 182 of the interdigitated capacitor 180.

Figure 13:
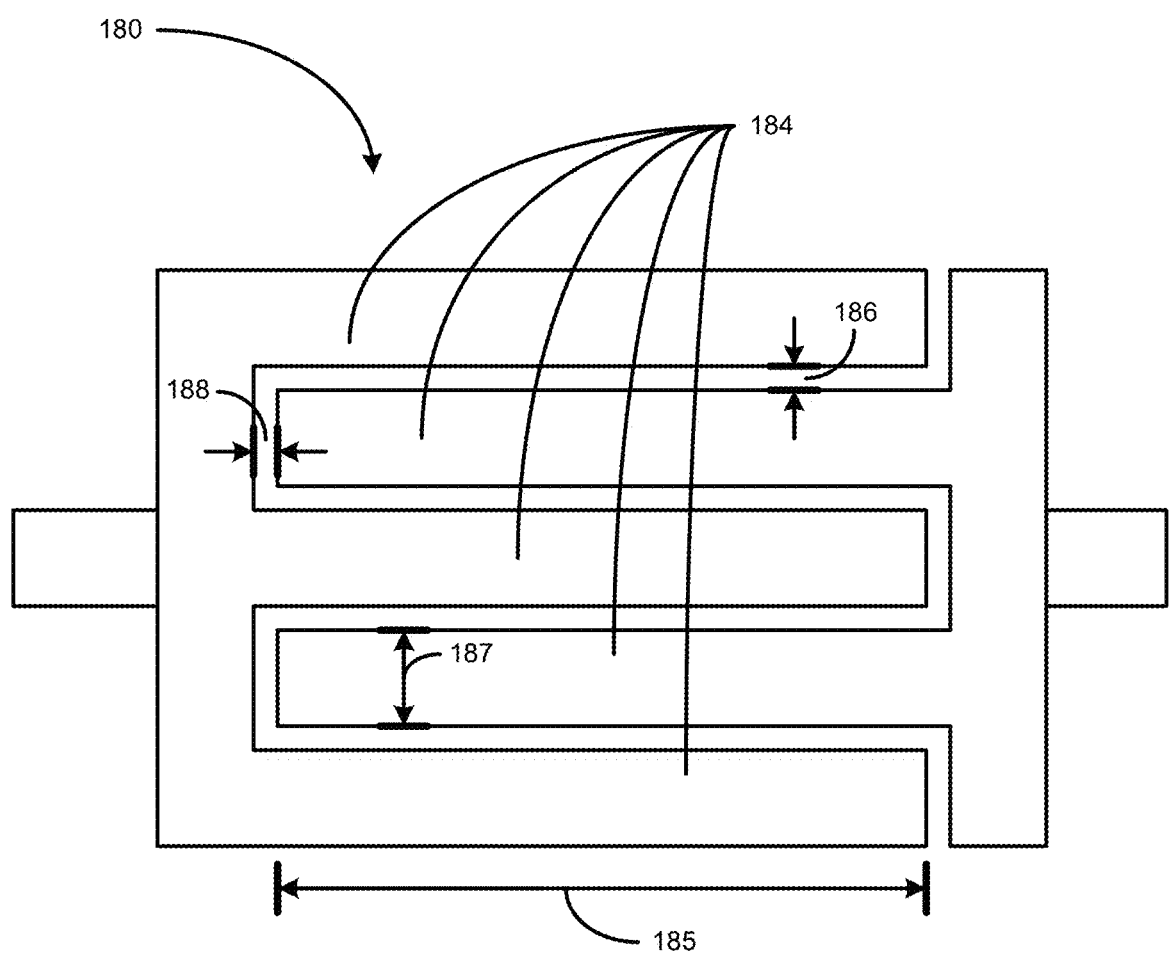
FIG. 13 is a top down view of an exemplary interdigitated capacitor, for use with any of FIGS. 12A, 12B, 14A, 14B, in accordance with the present disclosure.

The interdigitated capacitor 180 may be included to impart a desired capacitance to one or both of the transmission antennas 121A, 121B. The interdigitated capacitor 180 may utilize a parallel plate configuration that can provide a robust, thin design that is, generally, manufacturable at a lower cost, when compared to similar capacitor components. As best illustrated in FIG. 13, the interdigitated capacitor 180 has a finger-like shape, wherein the interdigitated capacitor 180 includes a plurality of micro-strip lines 184 that may produce one or more of high pass characteristics, low pass characteristics, and/or bandpass characteristics. The value of the capacitance of the interdigitated capacitor 180 generally depends on various construction parameters, such as, but not limited to, a length 185 of the micro-strip lines 184, a width 187 of the micro-strip line 184, a horizontal gap 186 between two adjacent micro-strip lines 184, and a vertical cap 188 between two adjacent micro strip lines 184. In one or more embodiments, the length 185 and the width 187 of the micro-strip lines 184 can be from about 10 mm to 600 mm, the horizontal gap 186 can be between about 0.1 mm to about 100 mm, and the vertical gap 188 can be between about 0.0001 mm to about 2 mm.

In some examples, the interdigitated capacitor 180 may be integrated within a substrate associated with one or both of the transmission antennas 121A, 121B, such as a PCB. Further, in some examples, the interdigitated capacitor 180 may be positioned within an opening or cavity within a substrate that supports one or both of the transmission antennas 121A, 121B. The interdigitated capacitor 180 may be used similarly to CD. for improvements in coil sensitivity, mass-manufacturability, and coil-to-coil efficiency. Additionally or alternatively, the interdigitated capacitor 180 may be utilized as a cost-effective means to add capacitance to one or both of the transmission antennas 121A, 121B. Further, the interdigitated capacitor 180 may be more mechanically durable, have a thinner form factor, and a lower cost, in comparison to a surface mount capacitor.

Figure 14A:
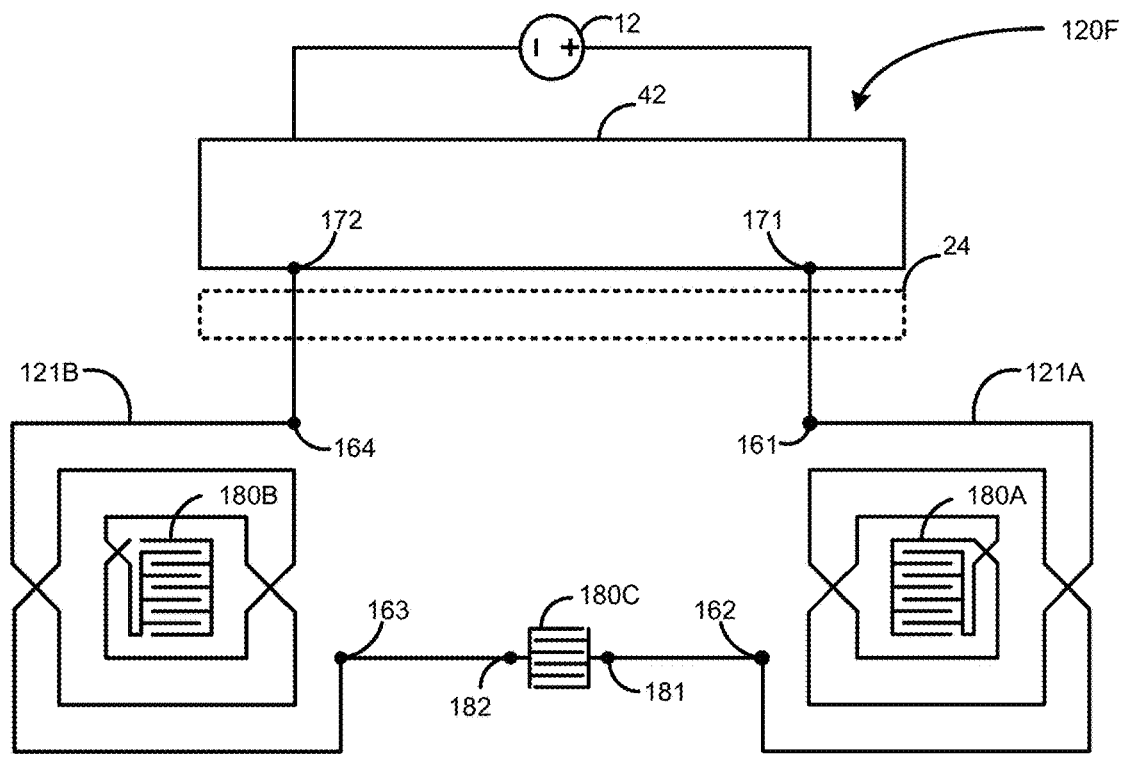
FIG. 14A is an electrical schematic diagram of a sixth embodiment of a wireless transmission system of the system of FIG. 7, illustrating an antenna configuration of the wireless transmission system, in accordance with FIG. 7 and the present disclosure.
Figure 14B:
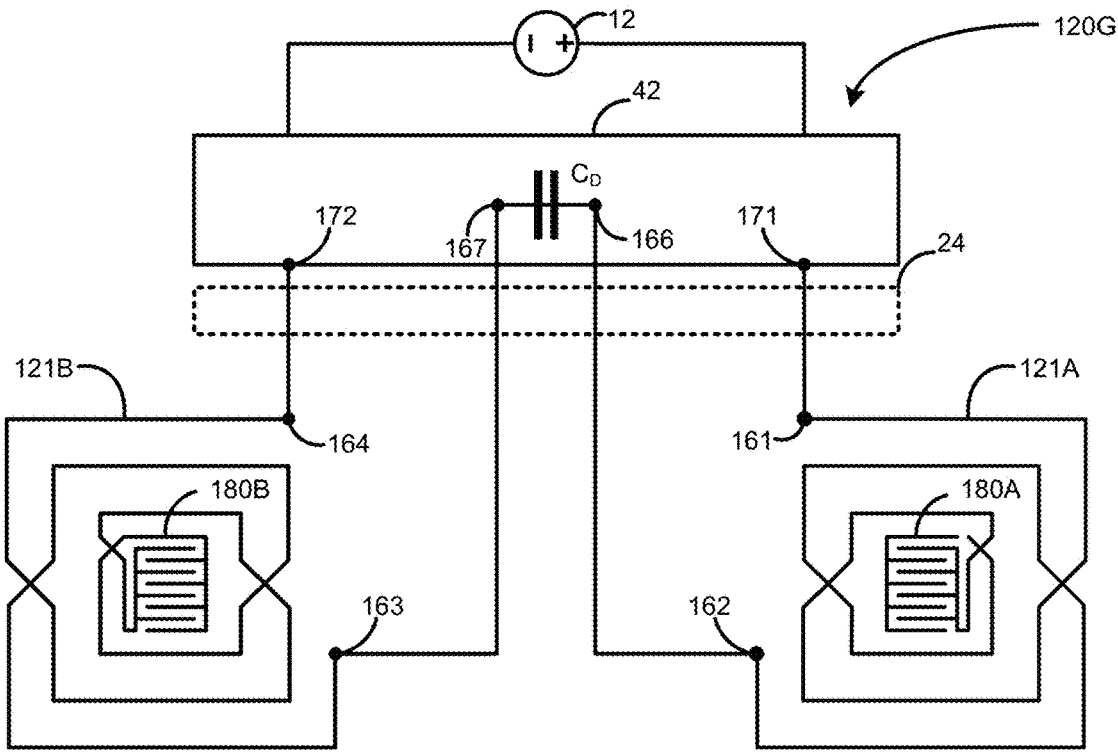
FIG. 14B is another schematic diagram of the sixth embodiment of the wireless transmission system of the system of FIG. 7, illustrating the antenna configuration of the wireless transmission system, in accordance with FIG. 7, FIG. 14A, and the present disclosure.

FIGS. 14A-B illustrate exemplary embodiments of wireless transmission systems 120F, 120G, wherein first and second interdigitated capacitors 180A, 180B are, respectively, disposed within or as a part of, respectfully, the first and second transmission antennas 121A, 121B. Accordingly, the interdigitated capacitors 180A, 180B may be positioned within or as a part of, respectfully, the first and second transmission antennas 121A, 121B and/or be the first and second transmission antennas 121A, 121B may be positioned around, respectively, the interdigitated capacitors 180A, 180B. Due to such positioning and/or inclusion, the interdigitated capacitors 180A, 180B provide a cost effective way to add capacitance to one or both of the first and second transmission antennas 121A, 121B. Accordingly, such configurations may be particularly useful in power transfer scenarios in which a larger than normal (e.g., greater than 25 mm) charging distance, between the transmission antenna 121 and a receiver antenna 31, is desired.

In the example of the wireless transmission system 120F of FIG. 14A, a third interdigitated capacitor 180C is electrically connected to the transmission antennas 121A, 121B in a like manner to the interdigitated capacitor 180 of FIGS. 24A-B. In this configuration, the added capacitance aids the transmission antennas 121A, 121B in wireless power transfer scenarios in which coil sensitivity and matching tolerance issues would otherwise arise. In the example of FIG. 14B, the wireless transmission system 120G includes $C_D$. connected via the amplifier 42 in like manner to the electrical connections between $C_D$ and the transmission antennas 121A, 121B of FIG. 11. The configuration of the wireless transmission system 120G may be particularly useful in scenarios in which the transmission antennas 121A, 121B cannot be disposed on a single substrate and/or PCB, yet would benefit from the advantages of the antenna-disposed placement of the interdigitated capacitors 180A, 180B.

Figure 15A:
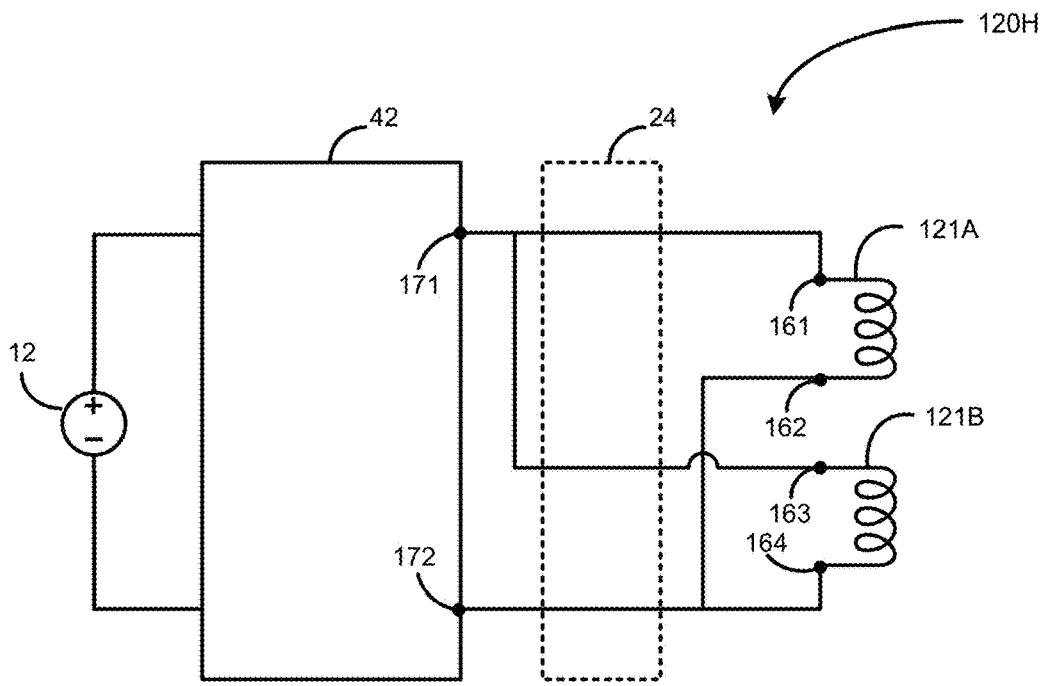
FIG. 15A is an electrical schematic diagram of a seventh embodiment of a wireless transmission system of the system of FIG. 7, illustrating an antenna configuration of the wireless transmission system, in accordance with FIG. 7 and the present disclosure.
Figure 15B:
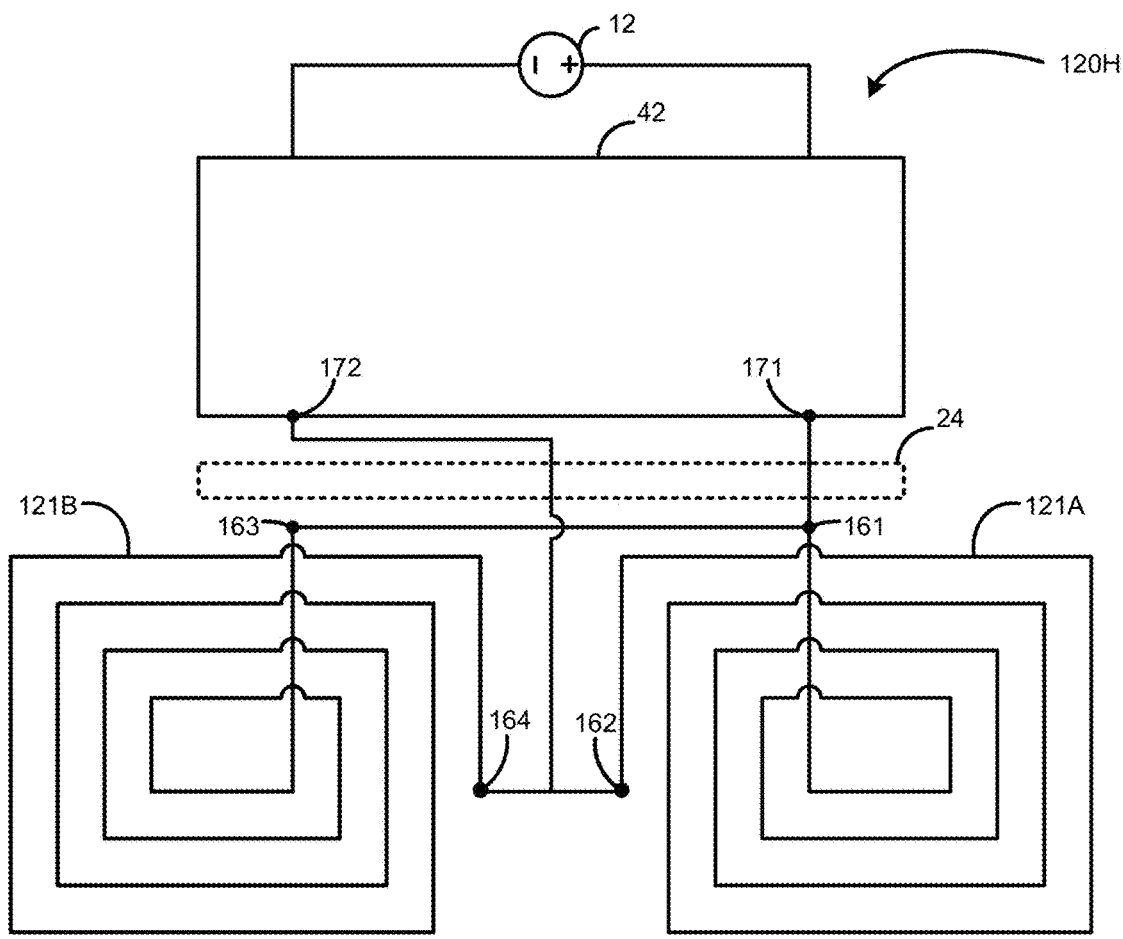
FIG. 15B is another schematic diagram of the sixth embodiment of the wireless wireless transmission system, in accordance with FIG. 7, FIG. 15A, and the present disclosure.

FIGS. 15A-B illustrate another embodiment of a wireless transmission system 120H, wherein the first transmission antenna 121A and the second transmission antenna 121B are in parallel electrical connection, with respect to the power conditioning system 40 and/or the amplifier 42. To that end, in achieving the parallel electrical connection, the first pole of the first transmission antenna 121A and the third pole of the second transmission antenna 121B are in electrical connection with the first power pole 171. Additionally, the second pole 162 of the first transmission antenna 121A and the fourth pole 164 of the second transmission antenna 121B are in electrical connection with the second power pole 172. The parallel electrical connection of the wireless transmission system 120H may be advantageous in applications that require providing power to independent, identical loads efficiently and at a low cost. Accordingly, the parallel electrical connection of the wireless transmission system 120H may be advantageous in wireless power transfer scenarios that are configured for direct power, rather than charging a storage load. Additionally, the parallel electrical connection of the wireless transmission system 120H may be advantageous in configurations that require a lower voltage requirement with a greater current requirement.

Figure 16:
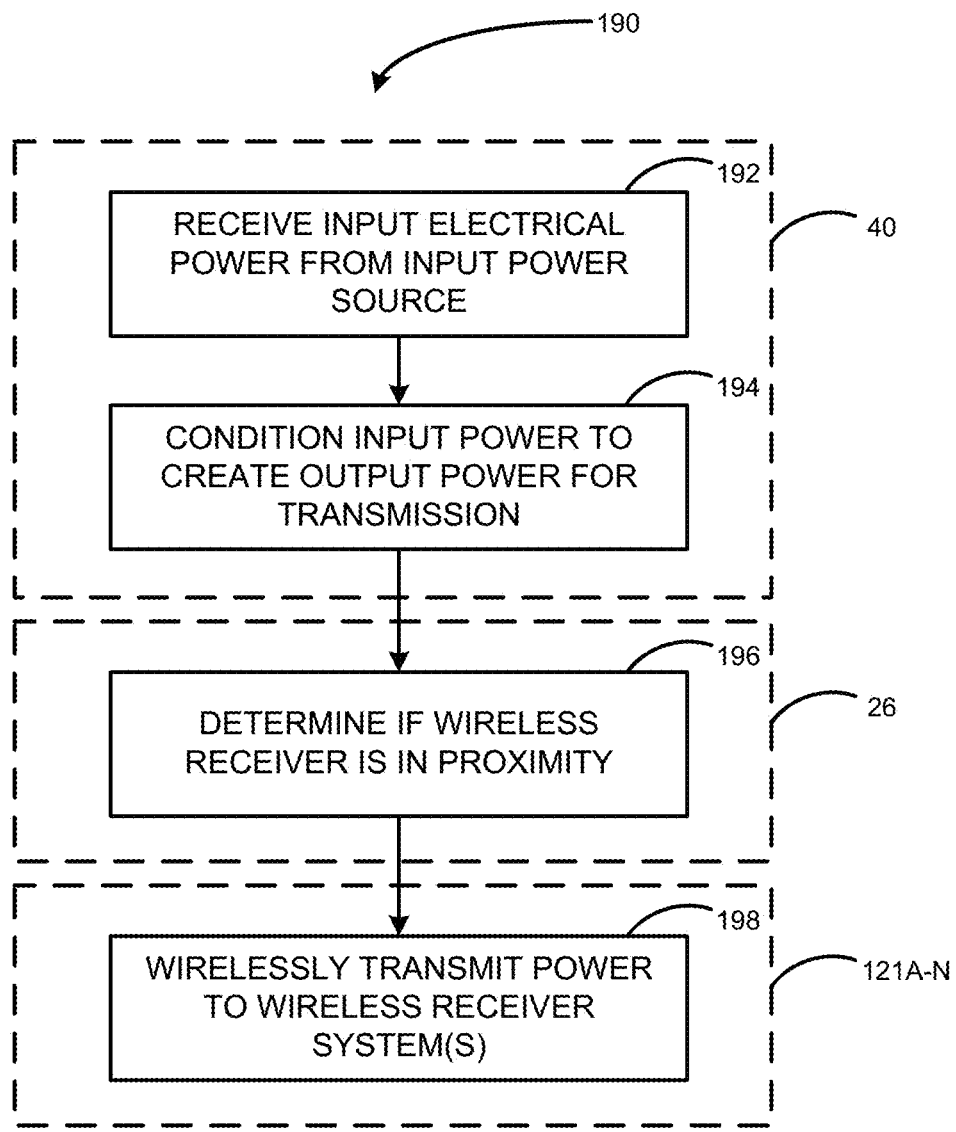
FIG. 16 is a flowchart for a method for operating one or more of the wireless transmission systems of FIGS. 7-15, in accordance with FIGS. 7-15 and the present disclosure.

Turning now to FIG. 16 and with continued reference to FIGS. 7-15, a block diagram for a method 190 for operating the wireless transmission system 120 is disclosed. As illustrated, the labeled, dashed-lined borders surrounding one or more blocks indicate which components of the wireless transmission system 120 performs said blocks (e.g., blocks 192, 194 are performed by the power conditioning system 40). The method 190 begins at block 192, wherein the power condition system receives input electrical power from the input power source 14. Then, the power conditioning system 40 conditions the input power to create output power for transmission by one, two or more transmission antennas 121A-N, as illustrated in block 194. The method 190 further includes determining, by, at least, the transmission control system 26, if at least one wireless receiver system 30 is in couplable proximity to at least one of the transmission antennas 121A-N, as illustrated at block 196. If the transmission control system 26 determines that a wireless receiver system 30 is in couplable proximity, then the method 190 includes wirelessly transmitting power to at least one wireless receiver system 30, by one or more of the transmission antennas 121A-N, as illustrated in block 198.

Figure 17:
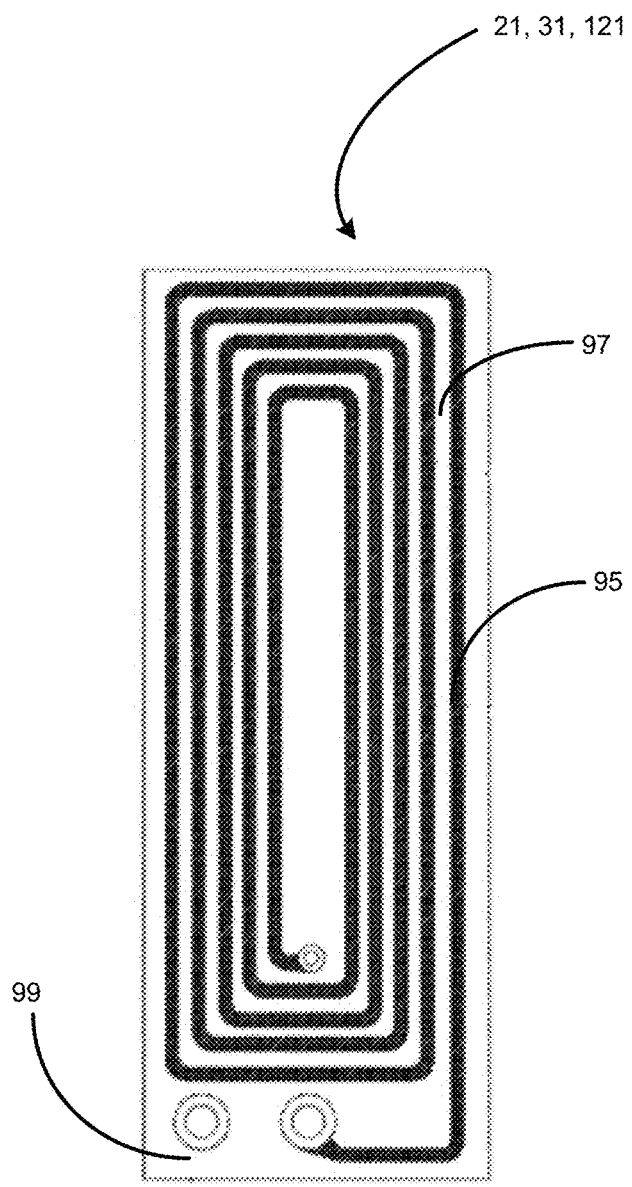
FIG. 17 is a top view of an exemplary antenna, for use as one or both of a transmission antenna and a receiver antenna of the system of FIG. 1 and/or any other systems, methods, or apparatus disclosed herein, in accordance with the present disclosure.

Turning now to FIG. 17, an exemplary, non-limiting embodiment of one or more of the transmission antenna 21, the transmission antenna(s) 121, and the receiver antenna 31 that may be used with any of the systems, methods, and/or apparatus disclosed herein. In the illustrated embodiment, the antenna 21, 31, 121, is a flat spiral coil configuration. In the exemplary embodiment shown, the antenna comprises four layers of alternating of an electrical conductor and electrically insulating layers integrated into a printed circuit board (PCB), flexible circuit board (FPC), or a hybrid circuit board (HCB), the HBC comprising a PCB portion and an FPC portion. As shown, the antenna 21, 31, 121 comprises two antenna segments that are electrically connected in series. As shown, the antenna 21, 31, 121 is constructed having five turns of a copper trace 95 deposited on the surface of an insulative substrate 99 with a gap 97 of, for example, 15 to 200 microns between each turn of the trace 95. Each segment comprises an electrical conductor (e.g., trace 95) positioned on an insulative substrate 98 in an electrical parallel configuration. Non-limiting examples can be found in U.S. Pat. Nos. 9,941,743, 9,960,628, 9,941,743 all to Peralta et al., U.S. Pat. Nos. 9,948,129, 10,063,100 to Singh et al., U.S. Pat. No. 9,941,590 to Luzinski, U.S. Pat. No. 9,960,629 to Rajagopalan et al. and U.S. Patent App. Nos. 2017/0040107, 2017/0040105, 2017/0040688 to Peralta et al., all of which are assigned to the assignee of the present application and incorporated fully herein by reference.

In addition, the antenna 21, 31, 121 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, 9,300,046, all to Singh et al., assigned to the assignee of the present application are incorporated fully herein. It is also noted that other antennas such as, but not limited to, an antenna configured to send and receive signals in the UHF radio wave frequency such IEEE standard 802.15.1 may be incorporated within the systems, methods, and/or apparatus of the present invention.

Figure 18:
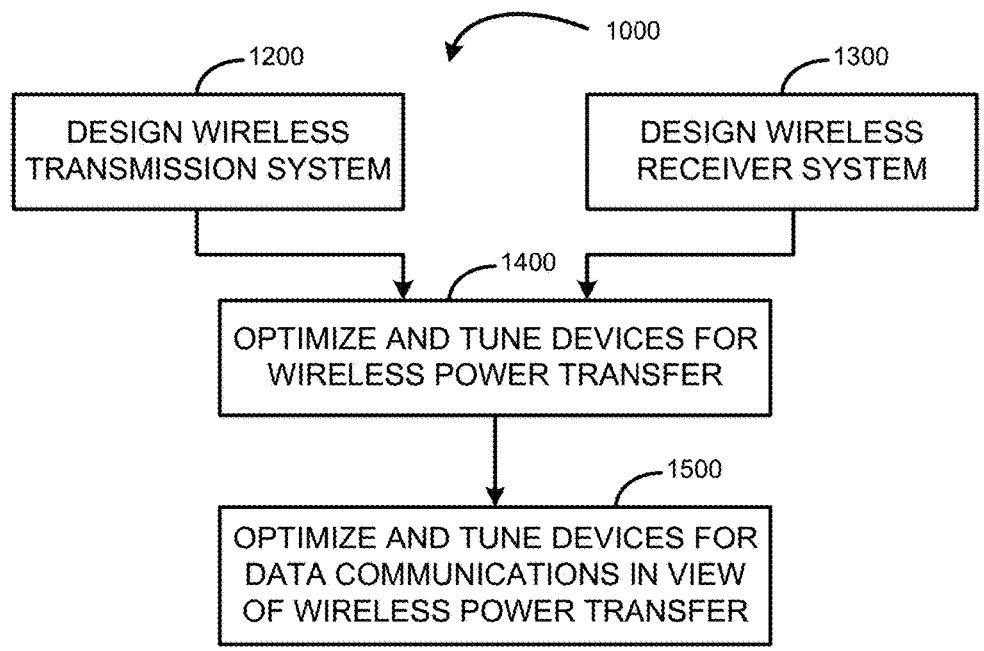
FIG. 18 is a flow chart for an exemplary method for designing a system for wireless transmission of one or more of electrical energy, electrical power, electromagnetic energy, electronic data, and combinations thereof, in accordance with FIGS. 1-17 and the present disclosure.

FIG. 18 is an example block diagram for a method 1000 for designing a system for wirelessly transferring one or more of electrical energy, electrical power, electromagnetic energy, and electronic data, in accordance with the systems, methods, and apparatus of the present disclosure. To that end, the method 1000 may be utilized to design a system in accordance with any disclosed embodiments of the systems 10, 110 and any components thereof.

At block 1200, the method 1000 includes designing a wireless transmission system for use in the system 10, 110. The wireless transmission system designed at block 1200 may be designed in accordance with one or more of the aforementioned and disclosed embodiments of the wireless transmission systems 20, 120, and 120A-H, in whole or in part and, optionally, including any components thereof. Block 1200 may be implemented as a method 1200 for designing a wireless transmission system.

Figures 19, 20:
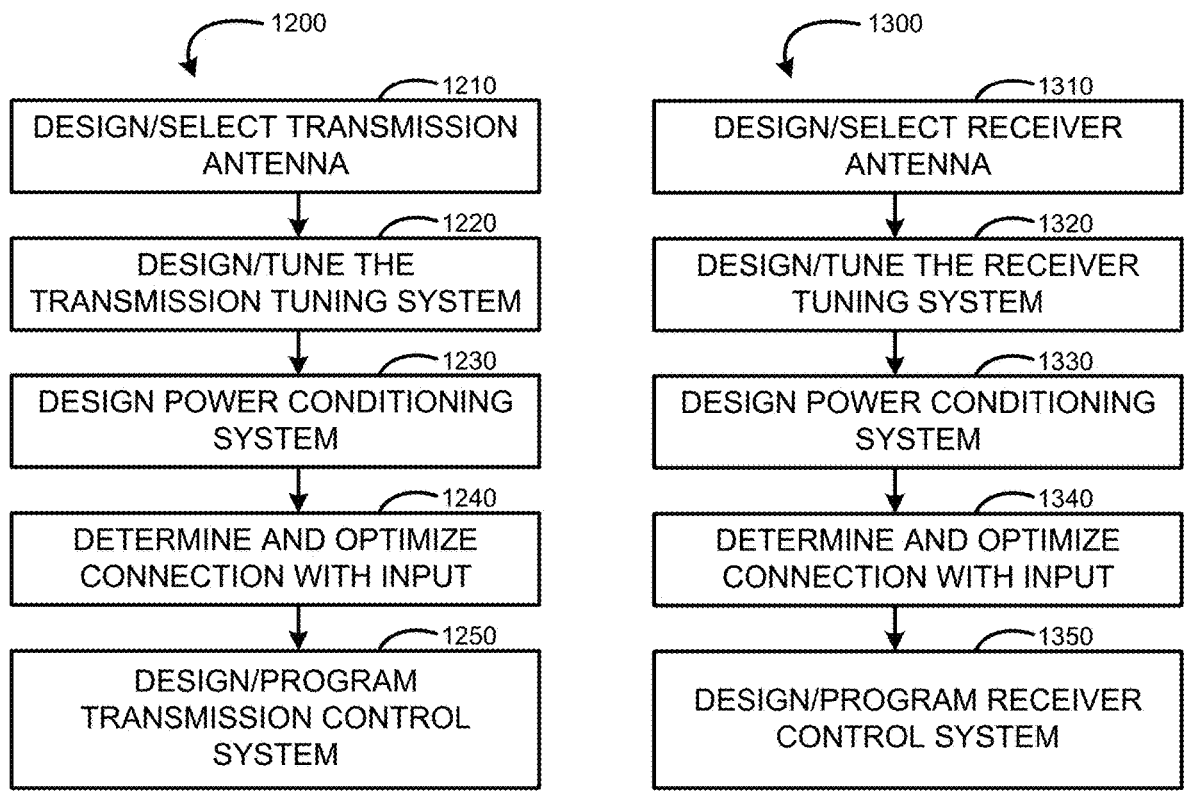
FIG. 19 is a flow chart for an exemplary method for designing a wireless transmission system for the system of FIG. 18, in accordance with FIGS. 1-17, and the present disclosure.
FIG. 20 is a flow chart for an exemplary method for designing a wireless receiver system for the system of FIG. 18, in accordance with FIGS. 1-17 and the present disclosure.

Turning now to FIG. 19 and with continued reference to the method 1000 of FIG. 18, an example block diagram for the method 1200 for designing a wireless transmission system is illustrated. The wireless transmission system designed by the method 1000 may be designed in accordance with one or more of the aforementioned and disclosed embodiments of the wireless transmission systems 20, 120, and 120A-H in whole or in part and, optionally, including any components thereof. The method 1200 includes designing and/or selecting a transmission antenna for the wireless transmission system, as illustrated in block 1210. The designed and/or selected transmission antenna may be designed and/or selected in accordance with one or more of the aforementioned and disclosed embodiments of the transmission antenna 21, 121, 121A-N, in whole or in part and including any components thereof. The method 1200 includes designing and/or tuning a transmission tuning system for the wireless transmission system, as illustrated in block 1220. Such designing and/or tuning may be utilized for, but not limited to being utilized for, impedance matching, as discussed in more detail above. The designed and/or tuned transmission tuning system may be designed and/or tuned in accordance with one or more of the aforementioned and disclosed embodiments of wireless transmission systems 20, 120, and 120A-H in whole or in part and, optionally, including any components thereof.

The method 1200 further includes designing a power conditioning system for the wireless transmission system, as illustrated in block 1230. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40, in whole or in part and, optionally, including any components thereof. Further, at block 1240, the method 1200 may determine and optimize a connection, and any associated connection components, to configure and/or optimize a connection between the input power source 12 and the power conditioning system of block 1230. Such determining, configuring, and/or optimizing may include selecting and implementing protection mechanisms and/or apparatus, selecting and/or implementing voltage protection mechanisms, among other things.

The method 1200 further includes designing and/or programing a transmission control system of the wireless transmission system of the method 1000, as illustrated in block 1250. The designed transmission control system may be designed in accordance with one or more of the aforementioned and disclosed embodiments of the transmission control system 26, in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 18, at block 1300, the method 1000 includes designing a wireless receiver system for use in the system 10. The wireless transmission system designed at block 1300 may be designed in accordance with one or more of the aforementioned and disclosed embodiments of the wireless receiver system 30 in whole or in part and, optionally, including any components thereof. Block 1300 may be implemented as a method 1300 for designing a wireless receiver system.

Turning now to FIG. 20 and with continued reference to the method 1000 of FIG. 8, an example block diagram for the method 1300 for designing a wireless receiver system is illustrated. The wireless receiver system designed by the method 1300 may be designed in accordance with one or more of the aforementioned and disclosed embodiments of the wireless receiver system 30 in whole or in part and, optionally, including any components thereof. The method 1300 includes designing and/or selecting a receiver antenna for the wireless receiver system, as illustrated in block 1310. The designed and/or selected receiver antenna may be designed and/or selected in accordance with one or more of the aforementioned and disclosed embodiments of the receiver antenna 31, in whole or in part and including any components thereof. The method 1300 includes designing and/or tuning a receiver tuning system for the wireless receiver system, as illustrated in block 1320. Such designing and/or tuning may be utilized for, but not limited to being utilized for, impedance matching, as discussed in more detail above. The designed and/or tuned receiver tuning system may be designed and/or tuned in accordance with one or more of the aforementioned and disclosed embodiments of the receiver tuning system 34 in whole or in part and/or, optionally, including any components thereof.

The method 1300 further includes designing a power conditioning system for the wireless receiver system, as illustrated in block 1330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 1340, the method 1300 may determine and optimize a connection, and any associated connection components, to configure and/or optimize a connection between the load 16 and the power conditioning system of block 1330. Such determining, configuring, and/or optimizing may include selecting and implementing protection mechanisms and/or apparatus, selecting and/or implementing voltage protection mechanisms, among other things.

The method 1300 further includes designing and/or programing a receiver control system of the wireless receiver system of the method 1300, as illustrated in block 1350. The designed receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 1000 of FIG. 18, the method 1000 further includes, at block 1400, optimizing and/or tuning both the wireless transmission system and the wireless receiver system for wireless power transfer. Such optimizing and/or tuning includes, but is not limited to including, controlling and/or tuning parameters of devices to match impedance, optimize and/or configure voltage and/or power levels of an output power signal, among other things and in accordance with any of the disclosed systems, methods, and apparatus herein. Further, the method 1000 includes optimizing and/or tuning both the wireless transmission system and the wireless receiver system for data communications, in view of system characteristics necessary for wireless power transfer. Such optimizing and/or tuning includes, but is not limited to including, optimizing power characteristics for concurrent transmission of electrical energy and electrical data signals, tuning quality factors of antennas for different transmission schemes, among other things and in accordance with any of the disclosed systems, methods, and apparatus herein.

FIG. 21 is an example block diagram for a method 2000 for manufacturing a system for wirelessly transferring one or both of electrical energy and electronic data, in accordance with the systems, methods, and apparatus of the present disclosure. To that end, the method 2000 may be utilized to manufacture a system in accordance with any disclosed embodiments of the systems 10, 110 and any components thereof.

At block 2200, the method 2000 includes manufacturing a wireless transmission system for use in the system 10. The wireless transmission system manufactured at block 2200 may be designed in accordance with one or more of the aforementioned and disclosed embodiments of the wireless transmission systems 20, 120 and/or 120A-H in whole or in part and, optionally, including any components thereof. Block 2200 may be implemented as a method 2200 for manufacturing a wireless transmission system.

Turning now to FIG. 22 and with continued reference to the method 2000 of FIG. 21, an example block diagram for the method 2200 for manufacturing a wireless transmission system is illustrated. The wireless transmission system manufactured by the method 2000 may be manufactured in accordance with one or more of the aforementioned and disclosed embodiments of the wireless transmission systems 20, 120, and 120A-H in whole or in part and, optionally, including any components thereof. The method 2200 includes manufacturing a transmission antenna for the wireless transmission system, as illustrated in block 2210. The manufactured transmission system may be built and/or tuned in accordance with one or more of the aforementioned and disclosed embodiments of the transmission antenna 21, 121, and 121A-N, in whole or in part and including any components thereof. The method 2200 includes building and/or tuning a transmission tuning system for the wireless transmission system, as illustrated in block 2220. Such designing and/or tuning may be utilized for, but not limited to being utilized for, impedance matching, as discussed in more detail above. The built and/or tuned transmission tuning system may be designed and/or tuned in accordance with one or more of the aforementioned and disclosed embodiments of the transmission tuning system 24, in whole or in part and, optionally, including any components thereof.

The method 2200 further includes selecting and/or connecting a power conditioning system for the wireless transmission system, as illustrated in block 2230. The power conditioning system manufactured may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40 in whole or in part and, optionally, including any components thereof. Further, at block 2240, the method 2200 may determine and optimize a connection, and any associated connection components, to configure and/or optimize a connection between the input power source 12 and the power conditioning system of block 2230. Such determining, configuring, and/or optimizing may include selecting and implementing protection mechanisms and/or apparatus, selecting and/or implementing voltage protection mechanisms, among other things.

The method 2200 further includes assembling and/or programing a transmission control system of the wireless transmission system of the method 2000, as illustrated in block 2250. The assembled transmission control system may be designed in accordance with one or more of the aforementioned and disclosed embodiments of the transmission control system 26 in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 21, at block 2300, the method 2000 includes manufacturing a wireless receiver system for use in the system 10. The wireless transmission system manufactured at block 2300 may be designed in accordance with one or more of the aforementioned and disclosed embodiments of the wireless receiver system 30 in whole or in part and, optionally, including any components thereof. Block 2300 may be implemented as a method 2300 for manufacturing a wireless receiver system.

Turning now to FIG. 23 and with continued reference to the method 2000 of FIG. 21, an example block diagram for the method 2300 for manufacturing a wireless receiver system is illustrated. The wireless receiver system manufactured by the method 2000 may be designed in accordance with one or more of the aforementioned and disclosed embodiments of the wireless receiver system 30 in whole or in part and, optionally, including any components thereof.

The method 2300 includes manufacturing a receiver antenna for the wireless receiver system, as illustrated in block 2310. The manufactured receiver antenna may be manufactured, designed, and/or selected in accordance with one or more of the aforementioned and disclosed embodiments of the receiver antenna 31 in whole or in part and including any components thereof. The method 2300 includes building and/or tuning a receiver tuning system for the wireless receiver system, as illustrated in block 2320. Such building and/or tuning may be utilized for, but not limited to being utilized for, impedance matching, as discussed in more detail above. The built and/or tuned receiver tuning system may be designed and/or tuned in accordance with one or more of the aforementioned and disclosed embodiments of the receiver tuning system 34 in whole or in part and, optionally, including any components thereof.

The method 2300 further includes selecting and/or connecting a power conditioning system for the wireless receiver system, as illustrated in block 2330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 2340, the method 2300 may determine and optimize a connection, and any associated connection components, to configure and/or optimize a connection between the load 16 and the power conditioning system of block 2330. Such determining, configuring, and/or optimizing may include selecting and implementing protection mechanisms and/or apparatus, selecting and/or implementing voltage protection mechanisms, among other things.

The method 2300 further includes assembling and/or programing a receiver control system of the wireless receiver system of the method 2300, as illustrated in block 2350. The assembled receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 2000 of FIG. 21, the method 2000 further includes, at block 2400, optimizing and/or tuning both the wireless transmission system and the wireless receiver system for wireless power transfer. Such optimizing and/or tuning includes, but is not limited to including, controlling and/or tuning parameters of devices to match impedance, optimize and/or configure voltage and/or power levels of an output power signal, among other things and in accordance with any of the disclosed systems, methods, and apparatus herein. Further, the method 2000 includes optimizing and/or tuning both the wireless transmission system and the wireless receiver system for data communications, in view of system characteristics necessary for wireless power transfer, as illustrated at block 2500. Such optimizing and/or tuning includes, but is not limited to including, optimizing power characteristics for concurrent transmission of electrical energy and electrical data signals, tuning quality factors of antennas for different transmission schemes, among other things and in accordance with any of the disclosed systems, methods, and apparatus herein.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment the system may transmit electrical power on the order of about 100 μW to about 10 W. In another embodiment, electrical power up to around about 500 W may also be transmitted. Specifically considering near field magnetic coupling (NFMC) as the mechanism of wireless power transfer between the wireless transmission systems 20, 120, 120A-H and the wireless receiver systems 30, it is well known that smaller sizes are generally more easily achievable if a higher operating frequency is selected. This is due to the inverse relationship of the required mutual inductance and the frequency of operation, as indicated by the following equation:

$$M = \frac{V_{induced}}{j * \omega * I_{Tx}}$$

where:

$V_{induced}$ is induced voltage on the receiver antenna coil $I_{tx}$ is the AC current flowing through the transmitter antenna coil, and ω is the operating frequency multiplied by 2π.

Since the required mutual inductance increases in order to enable the wireless transfer of electrical energy having increased, it is necessary to increase the inductance or coupling of the transmitter or receiver while minimizing AC losses. Mutual inductance can be calculated by the following relationship:

$$M = k * \sqrt{L_{Tx} * L_{Rx}},$$

where:

M is the mutual inductance of the system, k is the coupling of the system, $L_{Tx}$ is the inductance of the transmitter antenna coil, and $L_{Rx}$ is the inductance of the receiver antenna coil.

As the form factor of the antenna coil is reduced, attaining the required inductance on either the receiver or transmitter is accompanied by an increase in antenna coil resistance as the high number of turns required leads to a reduction in trace width. This increase in resistance typically reduces the quality factor of the antenna coil and overall coil to coil efficiency of the system where the Quality factor is defined as:

$$Q = \frac{\omega * L}{R},$$

where:

Q is the quality factor of the antenna coil,

L is the inductance of the antenna coil,

ω is the operating frequency of the antenna coil in radians/second (alternatively, if the frequency of operation is in Hz, the operating frequency is @ divided by 2π), R is the equivalent series resistance (ESR) at the operating frequency.

Further, transmission (Tx) antenna coil to receiver (Rx) antenna coil efficiency (Eff) is defined by the following equation:

$$Eff = \frac{k^2 * Q_{Rx} * Q_{Tx}}{1 + \sqrt{1 + k^2 * Q_{Rx} * Q_{Tx}}},$$

where:

k is the coupling of the system, $Q_{Rx}$ is the quality factor of the receiver antennal, and $Q_{Tx}$ is the quality factor of the transmission antenna.

In an embodiment, a ferrite shield may be incorporated within the antenna structure to improve antenna performance. Selection of the ferrite shield material is dependent on the operating frequency as the complex magnetic permeability (μ=μ'−j*μ") is frequency dependent. The material may be a sintered flexible ferrite sheet, a rigid shield, or a hybrid shield, wherein the hybrid shield comprises a rigid portion and a flexible portion. Additionally, the ferrite shield may be composed of varying material compositions. Examples of materials may include, but are not limited to, zinc comprising ferrite materials such as manganese-zinc, nickel-zinc, copper-zinc, magnesium-zinc, and combinations thereof.

In addition, depending on the operating frequency and power requirements of the system 10, 110, a hybrid antenna construction comprising a Litz wire and a PCB coil combination may be desired to efficiently transfer power. In an embodiment, a hybrid Litz wire and PCB coil combination may comprise the transmission antenna 21, 121, 121A-N or the receiver antenna 31 of a wrapped Litz wire construction and the other of the transmitter antenna 21, 121, 121A-N or the receiver antenna 31 may be constructed having a coil disposed on a surface of a circuit board such as the antenna shown in FIG. 17. Lower operating frequencies on the order of 100 kHz to several MHz range may require a certain mutual inductance between the transmission and receiver antenna 21, 31, 121, 121A-N. This is attainable by using a transmitter antenna 21, 121, 121A-B of a Litz wire construction having a novel ferrite core in combination with a receiver antenna 31 comprising a coil disposed on a surface of a circuit board, such as the antenna shown in FIG. 17.

In order to increase mutual inductance, the coupling and/or inductance of the transmitter module 20, 120, 120A-H or the receiver module 30 must be increased. However, due to the small form factor constraints, coupling is limited by the physical size of the connector modules. It is noted that using transmitter and receiver antennas 21, 31, 121, 121A-N of a construction comprising a coil disposed on the surface of a circuit board, such as the antenna shown in FIG. 17, may increase inductance and increase the resistance of the antenna coils thereby decreasing the quality factor Q and antenna to antenna efficiency.

In an embodiment, the system 10, 110 comprising a transmission system 20, 120, 120A-H having a transmission antenna 21, 121, 121A-N of a Litz-wire construction and a shielding material and a receiver system 30 having a receiver antenna 31 comprising a coil disposed on a surface of a circuit board (FIG. 17) may be used to increase the coupling and mutual inductance of an exemplary small form factor of the system 10, 110. To achieve a higher antenna to antenna efficiency, this configuration may be used to achieve the necessary power transfer while maintaining high Q factor at lower frequencies. These improvements may also increase the overall performance of an exemplary system 10, 110 having a relatively small form factor.

The choice of coil design and construction is determined by a combination of the following electrical and magnetic parameters: inductance (L), equivalent series resistance (ESR) at the operating frequency, coupling (k), and Mutual inductance. For lower operating frequencies, i.e., from about 100 kHz to about 10 MHz, and for achieving increased power transmission on the order of about 0.1 mm to about 100 mm, this particular antenna topology is beneficial. For example, per the mutual inductance equations, if the power to be delivered to a load is constant, while the operating frequency decreases, the mutual inductance between the transmitter and receiver antenna coils increases at a constant transmit current. Table I illustrates the improvement in mutual inductance. Table II illustrates the improvement in coupling and Table III illustrates the improvement in antenna to antenna efficiency.

TABLE I

| Transmitter Antenna Construction | Transmitter Antenna Shield | Receiver Antenna Construction | M (µH) |
|---|---|---|---|
| Coil on FR4 PCB | Sheet | Coil on FR4 PCB | 0.35 |
| Litz Wire | T-Core | Coil on FR4 PCB | 1.35 |

TABLE II

| Transmitter Antenna Construction | Transmitter Antenna Shield | Receiver Antenna Construction | Coupling |
|---|---|---|---|
| Coil on FR4 PCB | Sheet | Coil on FR4 PCB | 0.26 |
| Litz Wire | T-Core | Coil on FR4 PCB | 0.29 |

TABLE III

| Transmitter Antenna Construction | Transmitter Antenna Shield | Receiver Antenna Construction | Antenna to Antenna Efficiency |
|---|---|---|---|
| Coil on FR4 PCB | Sheet | Coil on FR4 PCB | 57.9% |
| Litz Wire | T-Core | Coil on FR4 PCB | 80.8% |

In addition, if the system 10 is operated at a higher frequency, i.e., on the order of about 1 MHz or greater, the required mutual inductance will be reduced, thereby allowing for smaller transmitter and receiver antennas 21, 31, 121, 121A-N, wireless transmission systems 20, 120, 120A-H and wireless receiver systems 30. As defined herein shielding material is a material that captures a magnetic field. An example of which is a ferrite material. In the embodiments detailed in Tables I-III, a sheet of ferrite material is positioned directly adjacent to the transmitter antenna 21, for example, behind the transmission antenna 21, 121, 121A-N. As defined herein a "T-Core" shielding material is a magnetic field shield assembly comprising a sheet of shielding material, such as a ferrite material, placed directly behind the transmitter or receiver antenna 21, 31, 121 and an additional second shielding material, such as a ferrite material, placed within the inside area of a coil in the plane of the transmitter or receiver antenna 21, 31, 121. Furthermore, the wireless transmission system 20 or the wireless receiver system 30 may be constructed having the respective transmitter or receiver antennas 21, 31, 121 comprising a "C-core" shielding material in which the shielding material, such as a ferrite material, configured similarly to the letter "C", is positioned adjacent to the antenna 21, 31, 121. In addition, the wireless transmission system 20 or the wireless receiver system 30 may be constructed having the respective transmitter or receiver antennas 21, 31, 121 comprising a "E-core" shielding material in which the shielding material, such as a ferrite material, configured similarly to the letter "E", is positioned adjacent to the antenna 21, 31, 121.

Utilizing relatively small sized printed circuit board or flexible printed circuit board (PCB/FPC) based coil-antennas allow for appropriate stackups, appropriate trace widths, gap widths and copper (or other conductive material) depths that are more suitable for higher frequencies. Further, printed circuit board and flex printed circuit board-based, coil-antennas are highly integrated into the PCB fabrication process, thereby allowing for integration with the rest of the circuitry. This also allows for the integration of MLMT antenna designs to reduce ESR and improve the Q of the antennas.

Furthermore, utilizing coils in a layered approach allows for other fabrication processes, for example, printing, printing on fabrics, semiconductor fabrication processes, such as a low temperature co-fired ceramic (LTCC) process, a high temperature co-fired ceramic (HTCC) process, and the like.

Small form factor PCB coil designs are suitable at higher operating frequencies due to a lower required inductance while maintaining a low coil ESR to minimize the power dissipated in the transmit and receive coils. Printed circuit board (PCB) coil antennas offer additional benefits from a manufacturing, cost and assembly standpoint compared to wire-wound antenna coil solutions. For applications with a strict requirement for overall assembly thickness, printed circuit board (PCB) coil antennas are preferred due to the reduced thickness possible even with multilayer construction.

The ferrite shield material selected for the coil combination also depends on the operating frequency as the complex magnetic permeability ($\mu=\mu'-j*\mu''$) is frequency dependent. The material may be a sintered flexible ferrite sheet or a rigid shield and be composed of varying material compositions.

It is noted that the construction of the antenna 21, 31, 121 is non-limiting. The antenna that is incorporated within a system may comprise magnetic wires or have a stamped metal construction. Furthermore, the antenna 21, 31, 121 may utilize thick film, thin film or other printing fabrication technologies in its construction.

In an embodiment, incorporation of a transmitter or receiver antenna 21, 31, 121 having a multi-layer-multi-turn (MLMT) construction significantly reduces the equivalent series resistance (ESR) of the respective wireless transmission systems 20 and wireless receiver systems 30 and the wireless connector system 10 of the present invention. The inventors have discovered that incorporation of at least one transmitter and receiver antenna 21, 31, 121 having a multi-layer-multi-turn (MLMT) construction reduces equivalent series resistance (ESR) of the wireless transmission system 20 or wireless receiver system 30 by about 50 percent.

Furthermore, reducing ESR improves the overall system efficiency and reduces heating in the antenna 21, 31, 121 and the system 10 by reducing the ($I^2 \times R$) losses in the coil. Table IV shown below details the measured ESR for two multi-layer-multi-turn (MLMT) antenna designs in comparison to an antenna constructed comprising Litz wire wrapped around an inductor. As shown in Table IV below, the antenna constructed with an MLMT design exhibited a lower inductance, (0.60 µH) and a lower equivalent series resistance (ESR) (0.50Ω) in comparison to the antenna having a traditional wound Litz wire construction. Thus, the transmitter or receiver antenna 21, 31, 121 having a multi-layer-multi-turn (MLMT) construction contributes to the increased electrical performance of increased electrical power transmission and increased module separation distance of the gap 17 of the system 10 of the present invention.

TABLE III

| Antenna Design | Frequency (MHz) | Inductance (µH) | ESR (Ω) |
| --- | --- | --- | --- |
| Litz Wire | 2 | 3.80 | 0.97 |
| MLMT | 2 | 0.60 | 0.50 |
| MLMT | 10 | 0.65 | 1.05 |

Exemplary ways of connecting the module to a host device include, but are not limited to, directly soldering or placing the at least one wireless transmission system 20 and wireless receiver systems 30 on a circuit board or a host device. Alternatively, the at least one wireless transmission system 20, 120, 120A-H and wireless receiver systems 30 could be connected to a circuit board or a host device using a wire/cable. Once connected to a host device, the full structure or at least a portion of the structure of the at least one wireless transmission system 20, 120, 120A-H and wireless receiver systems 30 may be encapsulated within an insulative coating.

In another embodiment, the system 10, 110 of the present application could include a module that can operate both as a transmitter and as a receiver, (e.g., a transceiver). In a further embodiment, the system 10, 110 of the present application may comprise a power and data transfer system in addition to a single antenna where the data is modulated into the power frequency.

In another embodiment, the system 10, 110 of the present invention may comprise multiple antennas within each wireless transmission system 20, 120, 120A-H and wireless receiver systems 30. If a multiple antenna system is employed, then the first antenna could be reserved for identification, diagnostics and any uni- or bi-directional data transfer, while the second antenna can be dedicated to power transfer.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

The invention claimed is:

1. A wireless power transfer system comprising:
 a wireless power transmitter comprising:
  a power conditioning system in an electrical connection with an input power, the power conditioning system configured to condition the input power to an output power for wireless power transmission;
  a first transmission antenna configured to transmit the output power, the first transmission antenna in electrical connection with the power conditioning system;
  a second transmission antenna configured to transmit the output power, the second transmission antenna in electrical connection the power conditioning system; and
  a distributed capacitor in a series electrical connection between the first transmission antenna and the second transmission antenna with respect to the power conditioning system; and
 at least one wearable electronic device comprising:
  at least one wireless power receiver system, wherein the at least one wireless power receiver system is operatively associated with a given load and comprises a receiver antenna configured to operatively couple with one or both of the first transmission antenna and the second transmission antenna for wireless power transfer.

2. The wireless power transfer system of claim 1 further comprising a printed circuit board (PCB), and wherein at least one of the first transmission antenna, and the second transmission antenna are functionally coupled with the PCB.

3. The wireless power transfer system of claim 1, further comprising a printed circuit board (PCB), and wherein the distributed capacitor is functionally coupled with the PCB.

4. The wireless power transfer system of claim 1, further comprising a printed circuit board (PCB), and wherein the distributed capacitor is not functionally coupled with the PCB.

5. The wireless power transfer system of claim 1 further comprising:
 a first interdigitated capacitor coupled with the first transmission antenna; and
 a second interdigitated capacitor coupled with the second transmission antenna.

6. The wireless power transfer system of claim 1, wherein the distributed capacitor comprises a first interdigitated capacitor.

7. The wireless power transfer system of claim 6, further comprising:
 a second interdigitated capacitor coupled with the first transmission antenna; and
 a third interdigitated capacitor coupled with the second transmission antenna.

8. The wireless power transfer system of claim 1, wherein the at least one wearable electronic device comprises one of an electronic watch, electronically modified glasses, altered-reality (AR) glasses, or virtual reality (VR) glasses.

9. The wireless power transfer system of claim 1, wherein the wireless power transmitter is operatively associated with one or more of a case for the at least one wearable electronic device, one or more receptacles for the at least one wearable electronic device, or combinations thereof.

10. The wireless power transfer system of claim 1, wherein the given load associated with the at least one wireless power receiver system is associated with a power storage device.

11. The wireless power transfer system of claim 1, wherein the given load associated with the at least one wireless power receiver system is associated with the wearable electronic device and is configured to receive direct power from the wireless power transfer system at the given load.

12. The wireless power transfer system of claim 1, wherein the wireless power transmitter further comprises a transmission control system configured to wirelessly transmit power proportionately based on a magnitude of a given load associated with the at least one wireless power receiver system of the at least one wearable electronic device.

13. The wireless power transfer system of claim 1, wherein the wireless power transmitter further comprises a transmission control system configured to wirelessly transmit substantially similar power to a given load associated with the at least one wireless power receiver system of the at least one wearable electronic device.

14. A method of operating a wireless power transfer system, the wireless power transfer system comprising a wireless power transmitter and at least one wearable electronic device, the wireless power transmitter comprising a power conditioning system, a first transmission antenna, a second transmission antenna, and a transmission control system, the at least one wearable electronic device comprising at least one wireless power receiver system that is operatively associated with a given load and comprises a receiver antenna, the method comprising:
 receiving input electrical power, from an input power source, at the power conditioning system;
 conditioning the input electrical power, at the power conditioning system, to create output power for wireless power transmission by one or both of the first transmission antenna and the second transmission antenna;
 providing the output power to the first transmission antenna by way of an electrical connection between the first transmission antenna and the power conditioning system;
 providing the output power to the second transmission antenna by way of a series electrical connection to the first transmission antenna, the series electrical connection comprising a distributed capacitor in electrical connection between the first transmission antenna and the second transmission antenna with respect to the power conditioning system;

operatively coupling receiver antenna with one or both of the first transmission antenna and the second transmission antenna; and after operatively coupling the receiver antenna with one or both of the first transmission antenna and the second transmission antenna, wirelessly transmitting power to the at least one wireless power receiver system by one or both of the first transmission antenna and the second transmission antenna.

15. The method of claim 14, further comprising:
determining, by the transmission control system, a level at which to provide power proportionately based on a magnitude of the given load operatively associated with the at least one wireless power receiver system; and wherein wirelessly transmitting power to the at least one wireless power receiver system by one or both of the first transmission antenna and the second transmission antenna comprises wirelessly transmitting power to the at least one wireless power receiver system proportionately based on the level at which to provide power proportionally based on a magnitude of the given load associated to the at least one wireless power receiver system.

16. The method of claim 14, wherein the at least one wireless receiver system comprises a first wireless receiver system and a second wireless receiver system, the given load is a first given load, and the second wireless receiver system is operatively associated with a second given load, the method further comprising:

determining, by the transmission control system, a level at which to provide substantially similar power to both the first given load and the second given load; and wherein wirelessly transmitting power to the at least one wireless power receiver system by one or both of the first transmission antenna and the second transmission antenna comprises wirelessly transmitting substantially similar power to the first wireless receiver system and the second wireless receiver system based on the level at which to provide substantially similar power to both the first given load and the second given load.

17. The method of claim 14, wherein the given load associated with the at least one wireless power receiver system is associated with a power storage device.

18. The method of claim 14, wherein the distributed capacitor comprises an interdigitated capacitor.

19. The method of claim 14, wherein the at least one wearable electronic device comprises one of an electronic watch, electronically modified glasses, altered-reality (AR) glasses, or virtual reality (VR) glasses.

20. The method of claim 14, wherein the wireless power transmitter is operatively associated with one or more of a case for the at least one wearable electronic device, one or more receptacle for the at least one wearable electronic device, or combinations thereof.

\* \* \* \* \*